US012015622B2

(12) United States Patent
Zhou et al.

(10) Patent No.: US 12,015,622 B2
(45) Date of Patent: Jun. 18, 2024

(54) PRIVACY-PRESERVING ONLINE BOTNET CLASSIFICATION SYSTEM UTILIZING POWER FOOTPRINT OF IoT CONNECTED DEVICES

(71) Applicants: Old Dominion University, Norfolk, VA (US); William & Mary, Williamsburg, VA (US)

(72) Inventors: Gang Zhou, Williamsburg, VA (US); Woosub Jung, Williamsburg, VA (US); Chunsheng Xin, Virginia Beach, VA (US); Danella Zhao, Virginia Beach, VA (US); Yizhou Feng, Norfolk, VA (US); Sabbir Ahmed Khan, Norfolk, VA (US)

( * ) Notice: Subject to any disclaimer, the term of this patent is extended or adjusted under 35 U.S.C. 154(b) by 339 days.

(21) Appl. No.: 17/669,540

(22) Filed: Feb. 11, 2022

(65) Prior Publication Data
US 2022/0278995 A1 Sep. 1, 2022

Related U.S. Application Data

(60) Provisional application No. 63/154,958, filed on Mar. 1, 2021.

(51) Int. Cl.
*H04L 9/40* (2022.01)
*G06N 3/04* (2023.01)
*G16Y 30/10* (2020.01)

(52) U.S. Cl.
CPC ........... *H04L 63/1416* (2013.01); *G06N 3/04* (2013.01); *G16Y 30/10* (2020.01); *H04L 63/0428* (2013.01)

(58) Field of Classification Search
CPC ............ H04L 63/1416; H04L 63/0428; H04L 2463/144; G06N 3/04; G06N 3/045; G06N 3/08; G16Y 30/10
See application file for complete search history.

(56) References Cited

U.S. PATENT DOCUMENTS

| | | | |
|---|---|---|---|
| 6,961,641 B1 * | 11/2005 | Forth | G06Q 50/06 700/297 |
| 9,727,267 B1 * | 8/2017 | Sebastian | G06F 3/0653 |
| 9,860,257 B1 * | 1/2018 | Kumar | G06F 11/3006 |
| 10,362,035 B1 * | 7/2019 | Corbett | G06F 21/73 |
| 10,389,168 B2 * | 8/2019 | Suman | G01R 31/086 |
| 10,880,743 B1 * | 12/2020 | Berzin | H04L 41/0806 |
| 11,483,766 B1 * | 10/2022 | Shukla | H04W 12/03 |

(Continued)

*Primary Examiner* — Aravind K Moorthy

(57) ABSTRACT

A system and method for the detection and system impact mitigation of bots in Internet of Things (IoT) devices, the system including a smart auditor configured to interface with and control a power supply of an IoT device, the smart auditor being configured to measure and transmit power usage information of the IoT device. The system then utilizing a historical database and various IoT devices and associated power usage patterns to identify anomalies in power usage by the IoT device based on historical data, utilize machine learning to recognize normal and non-normal power usage patterns, and generate a command to shut off power to the IoT device upon detection of malicious botnet activity. The system including encryption protocols to maintain privacy during communication of the power usage information as well as maintain integrity and secrecy regarding model information from the historical database.

20 Claims, 21 Drawing Sheets

(56) References Cited

U.S. PATENT DOCUMENTS

| | | | |
|---|---|---|---|
| 11,736,451 B2* | 8/2023 | Singh | H04L 12/18 |
| | | | 713/153 |
| 11,855,807 B1* | 12/2023 | Harper | G01M 15/02 |
| 11,923,695 B2* | 3/2024 | Melone | H02J 50/12 |
| 11,924,824 B2* | 3/2024 | Kwak | H04W 72/1263 |
| 2003/0061091 A1* | 3/2003 | Amaratunga | G06Q 10/06375 |
| | | | 705/7.31 |
| 2004/0138834 A1* | 7/2004 | Blackett | G01D 4/004 |
| | | | 702/62 |
| 2005/0144437 A1* | 6/2005 | Ransom | G06F 1/28 |
| | | | 700/286 |
| 2006/0241880 A1* | 10/2006 | Forth | G01R 22/10 |
| | | | 702/60 |
| 2007/0143864 A1* | 6/2007 | Cabana | H01M 10/42 |
| | | | 726/36 |
| 2008/0154802 A1* | 6/2008 | Chalupsky | G06Q 30/04 |
| | | | 705/412 |
| 2009/0168850 A1* | 7/2009 | Harris | H04W 76/50 |
| | | | 380/278 |
| 2010/0017242 A1* | 1/2010 | Hamilton, II | G06Q 10/00 |
| | | | 705/14.1 |
| 2011/0047370 A1* | 2/2011 | Nagel | H04L 41/34 |
| | | | 713/150 |
| 2012/0065789 A1* | 3/2012 | Scelzi | G05D 23/1393 |
| | | | 702/136 |
| 2012/0331309 A1* | 12/2012 | Scott | G06F 21/755 |
| | | | 713/194 |
| 2013/0152195 A1* | 6/2013 | Nandha Premnath | G06F 21/606 |
| | | | 726/22 |
| 2013/0269032 A1* | 10/2013 | Chasko | H04L 63/1491 |
| | | | 726/23 |
| 2013/0282196 A1* | 10/2013 | Tappeiner | G05B 19/0426 |
| | | | 700/295 |
| 2014/0013425 A1* | 1/2014 | Samson | G06F 21/755 |
| | | | 726/22 |
| 2014/0226813 A1* | 8/2014 | Heffner | H04L 63/0435 |
| | | | 380/44 |
| 2014/0310524 A1* | 10/2014 | Yamanaka | H04L 63/123 |
| | | | 713/170 |
| 2015/0222421 A1* | 8/2015 | Guo | H04L 9/003 |
| | | | 380/28 |
| 2015/0271021 A1* | 9/2015 | Logvinov | H04L 47/13 |
| | | | 370/238 |
| 2015/0365228 A1* | 12/2015 | Belenky | H04L 9/003 |
| | | | 380/30 |
| 2016/0004798 A1* | 1/2016 | Crawford | G06Q 10/067 |
| | | | 705/14.34 |
| 2016/0171632 A1* | 6/2016 | Tatourian | H04Q 9/00 |
| | | | 705/63 |
| 2016/0323736 A1* | 11/2016 | Donahue | H04L 63/061 |
| 2017/0070362 A1* | 3/2017 | Tappeiner | G05B 11/01 |
| 2017/0201492 A1* | 7/2017 | Kim | H04W 12/041 |
| 2017/0280435 A1* | 9/2017 | Egner | H04W 52/0261 |
| 2017/0318039 A1* | 11/2017 | Kareti | H04L 63/1416 |
| 2017/0364683 A1* | 12/2017 | Willden | G06F 12/14 |
| 2018/0165660 A1* | 6/2018 | High | G06Q 50/06 |
| 2018/0191196 A1* | 7/2018 | Lee | G07F 15/008 |
| 2018/0317079 A1* | 11/2018 | Kang | H04W 12/04 |
| 2018/0364982 A1* | 12/2018 | Satpathy | G06F 7/523 |
| 2018/0365776 A1* | 12/2018 | Chan | G16Y 30/00 |
| 2018/0376448 A1* | 12/2018 | Wild | H04W 68/005 |
| 2019/0065752 A1* | 2/2019 | Li | G06F 15/781 |
| 2019/0080091 A1* | 3/2019 | Kim | H04L 63/123 |
| 2019/0082241 A1* | 3/2019 | Schmidt | H04L 67/12 |
| 2019/0123580 A1* | 4/2019 | Bindea | G05B 13/026 |
| 2019/0140487 A1* | 5/2019 | Zeine | H02J 50/40 |
| 2019/0158353 A1* | 5/2019 | Johnson | G06F 16/95 |
| 2019/0229905 A1* | 7/2019 | Fan | H04L 63/0407 |
| 2019/0297065 A1* | 9/2019 | Kanungo | H04L 9/0891 |
| 2020/0034550 A1* | 1/2020 | Kim | H04L 9/085 |
| 2020/0036690 A1* | 1/2020 | Muzaffar | H04L 9/0618 |
| 2020/0067340 A1* | 2/2020 | Batra | H02J 50/80 |
| 2020/0092328 A1* | 3/2020 | Kim | G06F 12/1081 |
| 2020/0236104 A1* | 7/2020 | Konda | H04L 9/0844 |
| 2020/0244635 A1* | 7/2020 | Paulraj | H04L 9/0822 |
| 2020/0379118 A1* | 12/2020 | Reid | G01S 19/074 |
| 2021/0014205 A1* | 1/2021 | Montoya | G06N 7/01 |
| 2021/0021582 A1* | 1/2021 | Ratnaker | H04B 1/0064 |
| 2021/0026994 A1* | 1/2021 | Tehranipoor | G06F 30/343 |
| 2021/0084060 A1* | 3/2021 | Garg | H04L 63/1466 |
| 2021/0149837 A1* | 5/2021 | Mishra | G06F 15/7807 |
| 2021/0152035 A1* | 5/2021 | Smith | H02J 50/20 |
| 2021/0152578 A1* | 5/2021 | Alanazi | H04L 63/20 |
| 2021/0217038 A1* | 7/2021 | Sandre | G06K 19/0723 |
| 2021/0250374 A1* | 8/2021 | Miller | H04L 67/1097 |
| 2021/0258151 A1* | 8/2021 | Cristina | G06F 21/602 |
| 2021/0334020 A1* | 10/2021 | Yu | G06F 3/0614 |
| 2021/0385198 A1* | 12/2021 | Lee | G06F 21/566 |
| 2022/0038265 A1* | 2/2022 | Shaw | H04W 12/0433 |
| 2022/0188447 A1* | 6/2022 | Braghin | G06F 21/6254 |
| 2022/0188588 A1* | 6/2022 | Baarman | G06K 19/07773 |
| 2024/0036631 A1* | 2/2024 | Ma | H04W 76/30 |

\* cited by examiner

TABLE I

| IoT Botnet | Reported Day | Target Devices | Intrusion Method | Post-processing Jobs |
|---|---|---|---|---|
| Mirai | Sep. 2016 | IP Cameras | Brute Force Attack | Upload a binary through the Internet |
| Hajime | Oct. 2016 | Any device | Brute Force Attack | Upload a binary through the Internet |
| BrickerBot | Apr. 2017 | Any device | Brute Force Attack | Corrupting a device using Linux commands |
| Masuta | Jan. 2018 | Routers | Brute Force Attack | Upload a binary through the Internet |
| Sora | 18-May | Routers, CCTV-DVRs | Brute Force Attack | Upload a binary through the Internet |

FIG. 1C

Table II

| Header | Type | Description | Example |
|---|---|---|---|
| Hostname | String | Hostname of Smart Plug | smpg1 |
| Message ID | String | Unique ID for each message | 4da77a50-aeaf-11 |
| Sampling Rate | Integer | Sampling Rate of Current Sensor (Hz) | 1700 (Hz) |
| Window Size | Integer | Length of a single window (ms) | 1500 (ms) |
| Sliding Window Ratio | Integer | Ratio of Overlapping Data | 1: No Overlapping<br>2 : 1/2 Overlapping<br>3 : 1/3 Overlapping |
| Number of Data Points | Integer | The number of data points in a single TCP packet | 850 (Sampling Rate * Window Size / 1000 / Sliding Window Ratio) |
| Data Points | Float | List of Power consumption data (mW) | 1854.878 (mW) |

FIG. 5A

Raw Data Examples
smpg1,1e918934-8371-11,1700,1500,3,850,1598.780,1615.244,1638.110,...,1609.756
smpg1,2106ab72-8371-11,1700,1500,3,850,1597.866,1585.061,1617.073,...,1605.183
smpg1,23a8ed40-8371-11,1700,1500,3,850,1628.963,1601.524,1570.427,...,1600.610
smpg1,2629e916-8371-11,1700,1500,3,850,1624.390,1594.207,1614.329,...,1584.146
smpg1,28a951ae-8371-11,1700,1500,3,850,1596.037,1591.463,1594.207,...,1588.720

FIG. 5B

TABLE III

| Class | Description | Number of Instances | Total number of Instances |
|---|---|---|---|
| Idle | When IoT Service is not running | 4693 | 4693 |
| IoT Service (Security Camera) | Streaming Service | 4523 | 5976 |
| | Motion Detection | 1453 | |
| Reboot | When system is rebooting | 2200 | 2200 |
| Botnet | Malicious behavior while system is Idle | 2000 | 3000 |
| | Malicious behavior while system is running IoT service | 1000 | |

FIG. 8A

TABLE IV

| Ground Truth | Inference | | | | | |
|---|---|---|---|---|---|---|
| | Class 1 | Class 2 | Class 3 | Class 4 | | |
| Class 1 | 4672 | 21 | 0 | 0 | 99.55% | Recall |
| Class 2 | 15 | 5900 | 0 | 61 | 98.73% | |
| Class 3 | 0 | 23 | 2177 | 0 | 98.95% | |
| Class 4 | 2 | 5 | 0 | 2992 | 99.76% | |
| | 99.64% | 99.18% | 100% | 98.00% | Accuracy: 99.19% | |
| | Precision | | | | | |

FIG. 8B

Protocol 1 Privacy-preserving CNN Inference

*Inputs:* Received power trace X
*Outputs:* Prediction Status I on the given trace X

*The Protocol:*

1. Data Inferencer receives raw data X from Power Auditor, encrypts it as $[X']_C$, and sends $[X']_C$ to Computing Cloud.
2. Computing Cloud computes $[U]_C = K_1 W_1'[X']_C + K_1 B_1' + N_1$ where $K_1$ is a non-zero positive random number, $W_1'$ is a kernel, $B_1'$ is the encoded bias, $N_1$ is a pseudo-random zero-sum vector. Finally, Computing Cloud sends $[U]_C$ to Data Inferencer.
3. Data Inferencer decrypts $[U]_C$ and computes $Z_j = \sum_{i=0}^{3} U_{i+j}$, where $j$ is the convolution block index. Then, it feeds the result to the ReLU activation function and max pooling layer. Finally, it gets the result Y.
4. Data Inferencer encodes and encrypts Y as $[Y']_C$, and then sends it to Computing Cloud.
5. Computing Cloud removes the random number $K_1$ and computes the $[V']_C = K_2 W_2'[Y']_C + K_2 B_2' + N_2$, where the $K_2$ is a non-zero positive random number, $N_2$ is a pseudo-random zero-sum vector, and the subscript 2 of W indicates the corresponding variables at the fully connected layer in our CNN model. Then, Computing Cloud sends $[V']_C$ to Data Inferencer.
6. Data Inferencer decrypts $[V']_C$ and performs the summation similarly to Step 3 on each hidden unit block. Finally, it feeds the fully connected layer output into the softmax layer to get the final prediction status I for a given power trace. Depending upon the policy, Data Inferencer takes further actions if I represents a malicious intrusion.

FIG 9A

Table V

| | Smart Auditor | IoT Device | Botnet | Data Inferencer | Computing Cloud |
|---|---|---|---|---|---|
| Network Deployment | | Local Network | | | |
| Hardware Platform | Raspberry Pi 3 | Raspberry Pi 3 | Raspberry Pi 3 | Apple Mac Mini Server | Linux Server |
| CPU | 1.4GHz, Quad-core | 1.4Ghz, Quad-core | 1.4Ghz, Quad-core | 2.5GHz, Dual-core | 2.6GHz, 2*16 cores |
| Memory | 1GB | 1GB | 1GB | 8GB | 250GB |
| Sensor used | Current Sensor (INA219A) | Camera Sensor (Module v2) | N/A | N/A | N/A |
| Operating System | Raspbian 9 | Raspbian 10 | Raspbian 9 | macOS 10.15 | Ubuntu 18.04 |

FIG 10A

TABLE VI

| | CPU Load (Max %) | Memory Usage | Network Traffic | Processing Delay |
|---|---|---|---|---|
| Smart Auditor | 76% (400%) | 10MB | 123Kbps | 25ms |
| Data Inferencer | 40% (200%) | 50MB | 11.375Kbps | 160ms |
| Computing Cloud | 35% (3200%) | 30MB | - | 360ms |

FIG 10B

TABLE VII

| Ground Truth | Inference | | | | Recall |
|---|---|---|---|---|---|
| | Class 1 | Class 2 | Class 3 | Class 4 | |
| Class 1 | 1832 | 0 | 0 | 0 | 100% |
| Class 2 | 2 | 1708 | 19 | 25 | 97.38% |
| Class 3 | 1 | 0 | 1834 | 0 | 99.95% |
| Class 4 | 2 | 21 | 5 | 1710 | 98.34% |
| Precision | 99.73% | 98.79% | 98.71% | 98.56% | Accuracy: 98.95% |

FIG 10C

PRIVACY-PRESERVING ONLINE BOTNET CLASSIFICATION SYSTEM UTILIZING POWER FOOTPRINT OF IoT CONNECTED DEVICES

CROSS-REFERENCE TO RELATED APPLICATIONS

The present application is a continuation of, and claims priority to, U.S. Provisional Application No. 63/154,958 filed on Mar. 1, 2021, the disclosure of which is hereby incorporated by reference in its entirety.

COPYRIGHT STATEMENT

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNICAL FIELD

Detection and mitigation of botnet activity on network connected devices.

BACKGROUND

Recently, the number of Internet of Things (IoT) devices have been increasing rapidly. As such, IoT devices have become the new cybercrime intermediaries to process cyber-attacks and deploy malicious content.

In particular, for some IoT devices without human interaction, attacks were more difficult to ascertain, and due to the less frequent user interactions, were difficult to recognize them earlier.

Despite the clear indications of IoT devices misuse, identifying and understanding various characteristics of the abusive attacks still remains a challenge. Poor security on many IoT devices makes them soft targets, and often victims may not be even aware of infections.

However, existing research has been primarily directed toward identification of compromised devices via network traffic or network topology analysis.

SUMMARY

Contemplated herein is a method and apparatus for the detection and system impact mitigation of bots in IoT devices, the system including a smart auditor configured to interface with and control a power supply of an IoT device, the smart auditor including a power data processing unit configured to measure current power usage information from the IoT device; a networking module configured to receive and transmit the power usage information; and a power control unit configured to control the power supply of the IoT device.

The system can then also include an intermediate server and a primary remote server, where the intermediate server is configured to receive IoT device model information and current power usage information from the smart auditor, encrypt the IoT device model information and current power usage information, and transmit the encrypted IoT device model information and current power usage information to a primary remote server which can be utilized to perform more intensive computational tasks. The primary remote server can then be configured to receive the encrypted power usage information and current power usage information from the intermediate server.

In some such embodiments the primary remote server can then include a primary processor; and a primary non-transitory computer-readable medium containing a IoT power usage database containing historical power usage information of IoT devices in normal operation modes and infected operation modes, wherein the primary non-transitory computer-readable medium contains instructions for the primary processor to perform various tasks. These tasks can include the following tasks: receive and decrypt the information regarding a model of the IoT device; receive and decrypt the information regarding the current power usage information of the IoT device; compare the current power usage information to historical power usage information correlating to the particular model of the IoT device in both normal operation and in an infected state indicative of malicious bot activity on the IoT device; encrypt all data regarding a comparison between known power usage of the particular model of IoT device within the historical and the current power usage information of the IoT device; transmit the encrypted data regarding a comparison between known power usage of the particular model of IoT device within the historical and the current power usage information of the IoT device to the intermediate server;

In some embodiments the intermediate server can be provided between the smart auditor and the primary remote server, the intermediate server can then include: an intermediate processor; and an intermediate non-transitory computer-readable medium. In such embodiments, the intermediate non-transitory computer-readable medium can then contain instructions for the intermediate processor to perform the following tasks: communicate with the primary remote server; encrypt all data transmitted to the primary remote server regarding the IoT device; receive and decrypt the encrypted data regarding a comparison between known power usage of the particular model of IoT device within the historical and the current power usage information of the IoT device to the intermediate server; determine indications of bot activity based on the comparison received from the remote primary server; generate one or more recommended instructions for execution by the smart auditor; and transmit the one or more recommended instructions to the power control unit of the smart auditor, wherein upon a determination of an infected state of the IoT device, at least one recommended instruction being for the power control unit of the smart auditor to interrupt power to the IoT device. Accordingly, the power control unit of the smart auditor can then be configured to execute the one or more recommended instructions from the intermediate server;

In some embodiments, the system can then employ a convolutional neural network and an associated machine learning model or framework for classification of the current power usage information from the IoT device being deployed across the primary remote server and the intermediate server, wherein the primary remote server and the intermediate server are non-colluding. In some such embodiments the primary remote server can be provided as a plurality of distributed computing servers.

BRIEF DESCRIPTION OF THE DRAWINGS

In order to clearly illustrate various embodiments of the disclosure, the following section provides a brief description of the attached drawings, which are for illustrative purpose only. For those of ordinary skills in the art, other drawings of other embodiments may become apparent based on these drawings wherein:

FIG. 1C illustrates Table I which provides a listing of various historical botnet attacks and their respective intrusion methods and operation after installation;

FIG. 5A shows Table II, which identifies various exemplary packet interface format between an exemplary smart auditor and an exemplary the data inferencer or intermediate server 200 located on either one of or both of a remote primary server and an intermediate server of a bot detection system in accordance with various embodiments of the present invention;

FIG. 5B shows an exemplary string of raw data collected by the smart auditor and transmitted to the intermediate server and/or the primary remote server being illustrative of various aspects of the present invention;

FIG. 8A shows Table III, which identifies illustrates a n exemplary collected dataset illustrating the number of instances in which the bot detection system recognized determinable power traces when employed by various exemplary IoT devices;

FIG. 8B shows Table IV, which illustrates an exemplary confusion matrix implemented in an offline classification for initial training of the exemplary CNN of FIG. 7 in accordance with various aspects of the present invention;

FIG. 9A illustrates exemplary computational protocols employable by the CNN of FIG. 7 which can be employed by an exemplary CNN or bot detection system employed by the systems contemplated herein;

FIG. 10A shows Table V which shows a tabulated listing of exemplary components which can be utilized to implement various method steps and detect bots on a given IoT device being illustrative of various aspects of the present invention;

FIG. 10B shows Table VI, which shows a tabulated listing of exemplary components and their system performance metrics being illustrative of various aspects of the present invention;

FIG. 10C shows Table VII, which illustrates an exemplary confusion matrix implemented in an online classification for additional real-time training of the exemplary CNN of FIG. 7 in accordance with various aspects of the present invention;

DETAILED DESCRIPTION

Figure 1A:
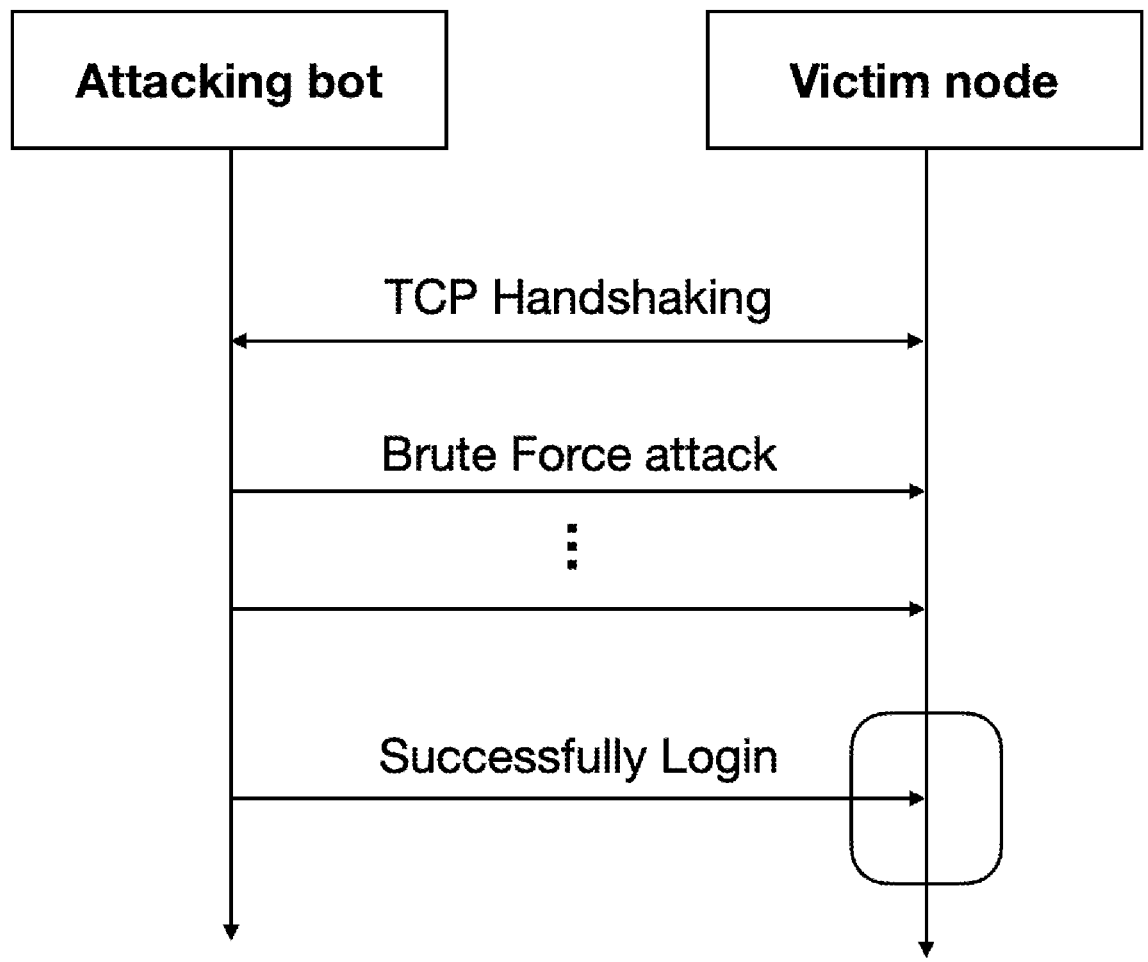
FIGS. 1A-B illustrate schematics of an exemplary prior art IoT framework and are used to provide context for various common malicious IoT bot attack methodologies.

Recently, the number of Internet of Things (IoT) devices have been increasing rapidly. As such, IoT devices have become the new cybercrime intermediaries to process cyberattacks and deploy malicious content. However, identifying and understanding the abusive attacks in the early stages are still challenging. Furthermore, IoT devices are not capable of deploying sophisticated detection algorithms. While cloud-based mechanisms can be a solution to leverage its tremendous computing power to detect misused IoT devices, this may raise data privacy concerns. It has been estimated that 29 billion IoT devices will be deployed by 2022 on all aspects of life. This popularity of IoT devices has attracted cybercriminals to conduct large-scale cyber-attacks. In addition to the large volume of IoT devices, cybercriminals also take advantage of the vulnerabilities of IoT devices, compared to the dedicated hosts, to deploy cyber-attacks and evade the IP blacklist-based detection. Further, some IoT devices, such as web cameras and routers, were known for their weak security protection. As reported, thousands of routers running outdated firmware were targeted by the worms exploiting one or more old vulnerabilities.

As such, these limitations inherent in IoT devices have resulted in them having become the new cybercrime intermediaries to process cyber-attacks and deploy malicious content. In October 2016, an IoT botnet attack was implemented which was employed by initiating a massive distributed denial-of-service (DDoS) attack which temporarily turned down a Domain Name System provider Dyn™, which caused major internet platforms and services, such as Amazon™, Netflix™, PayPal™, Twitter™, Playstation™, etc., to be unavailable to a large number of users in Europe and North America. This IoT botnet attack is now commonly referred to as Mirai and exceeded 600 Gbps in volume. Remarkably, this overwhelming traffic was sourced from 65,000 injected Internet of Things (IoT) devices, including routers, web cameras, and digital video recorders. Since then, many variants have emerged to target various flaws or weaknesses of many common IoT devices. Besides the intermediaries of DDoS attacks, IoT devices were also found to serve as attack proxies for multiple cybercrimes, such as clickjacking and spear phishing.

Despite the clear indications of IoT devices misuse, identifying and understanding various characteristics of the abusive attacks still remains a challenge. Poor security on many IoT devices makes them soft targets, and often victims may not be even aware of whether they are infected.

In particular, for some IoT devices with only limited or zero human interaction, attacks were more difficult to ascertain, and due to the less frequent user interactions, were difficult to recognize them earlier. However, existing researches to identify compromised devices is widely based on network traffic or network topology analysis. Moreover, those studies often targeted specific devices or protocols. In addition, IoT devices are not being controlled by just a few standardized operating systems or protocols. For example, 84 different IoT devices were found to engage in the Mirai bots, which are related to more than 300 different communication protocols and platforms. Therefore, new research is needed to find a universal security solution for diverse IoT devices in practical deployments. Furthermore, IoT devices are not capable of deploying sophisticated detection algorithms that often require significant resources. It is also inefficient to deploy a dedicated device for a single IoT device. Thus, cloud-based mechanisms can be a solution to leverage their tremendous computing power to detect misused IoT devices. This, of course, raises another challenge to the system, data privacy. Therefore, the new solution should also protect sensitive data from being disclosed to the cloud.

Network Intrusion Detection Systems (NIDS) have been scrutinized in the literature for many years. NIDS can be classified as either signature-based or anomaly-based methods. For signature-based methods, these systems can easily detect known attacks; however, it is vulnerable to unknown patterns. Anomaly-based methods usually rely on machine learning based methods to detect unusual network traffic. Among many types of intrusion attacks, some researchers surveyed bot attacks, which include network-based bot detection systems. Those approaches commonly take advantage of a specific protocol like SMTP or DNS to detect anomaly traffic.

Current research has typically been focusing on IoT security issues and bot attacks in IoT networks. The result is that most traditional bot detection systems or approaches are Network-based Bot Detection Systems in IoT networks.

However, several existing systems utilizing these methods need to be built inside individual IoT devices, which is not applicable to resource-constrained and diversified IoT devices. These solutions are not able to simultaneously address the three grand challenges, i.e., IoT bot attack stealthy, IoT device diversity, and non-invasiveness of expected IoT bot detections, that are targeted by the present exemplary system. Some previous systems proposed a power-auditing solution for botnet detection. However, such solutions typically need a bulky third-party power monitor device. Alternatively, the present disclosure utilizes extended state-of-the-art power-based design adapted to a real-time system so as to address the three grand challenges.

Preservation of data privacy has also been widely studied in the literature. There are three major approaches. The first approach is differential privacy, which injects noise into query results, such as perturbating stochastic gradient descent (SGD). However, the additive noise may degrade model accuracy. The second approach designs privacy-preserved protocols based on secure multi-party computations. They usually distribute secrets among a group of parties to achieve security computations at the expense of high computational overhead and strong security assumptions. Thus, they are rarely adopted in general scenarios. Also contemplated herein is a method for privacy preservation which includes using the fully homomorphic encryption. This encryption allows users to encrypt data and offload the computation to a cloud. The cloud can then be utilized to process the encrypted data offsite or without the need of local processing for each IoT device, after processing the cloud can then send back encrypted results. However, it has been recognized that nonlinear activation computation cannot be supported by the homomorphic encryption, and the approximation often has to be used. Compared with existing work, the present solution is novel in that this proposed method capitalizes on the proposed CNN model structure in order to adopt a smart design and thus address this problem.

In order to overcome these limitations, contemplated herein is a botnet detection system and method of employing said system. The contemplated botnet detection system is advantageous in that it is fine-grained, universal, non-invasive, and privacy-preserving. This proposed system exploits IoT devices' power side-channel information to identify IoT bots. The system is also configured to deploy a CNN online botnet classifier in a cloud computing environment. To protect the private data from IoT devices, the system utilizes a privacy-preserved protocol via packed homomorphic encryption (PHE). This PHE allows for the system to be secure against any semi-honest user-hold application and model-hold server. The system then validates utilizing the CNN Classifier from the offline dataset. Then, the system is also configured so as to provide online system performance metrics in a generated testbed. Utilizing the proposed system and methods, the system is able to collect power instances and detect malicious behavior in real-time.

Figure 2A:
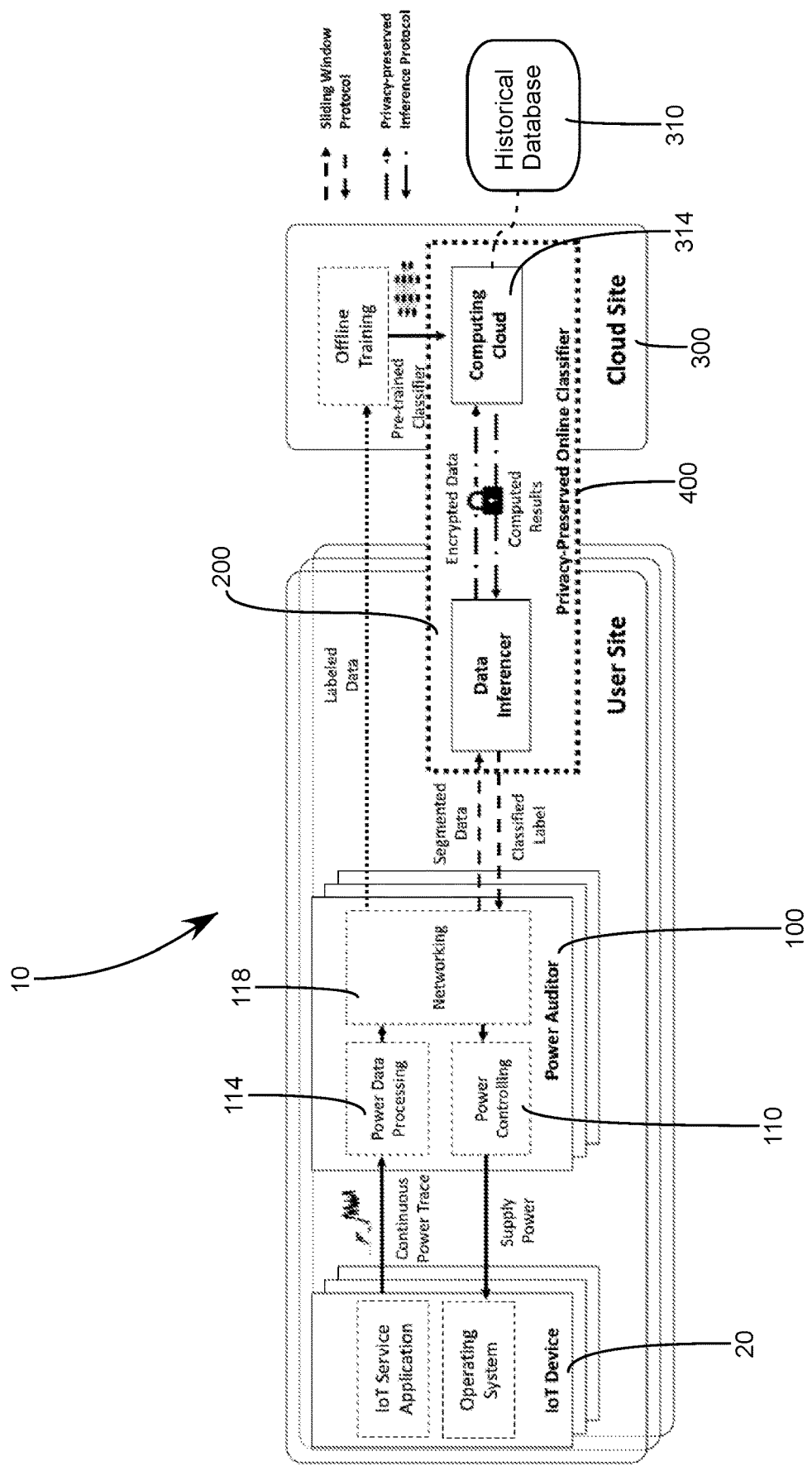
FIG. 2A illustrates an exemplary schematic showing a network topology having an IoT device employing an exemplary bot detection system capable of employing various methods for bot detection in accordance with various embodiments of the present invention.
Figure 2B:
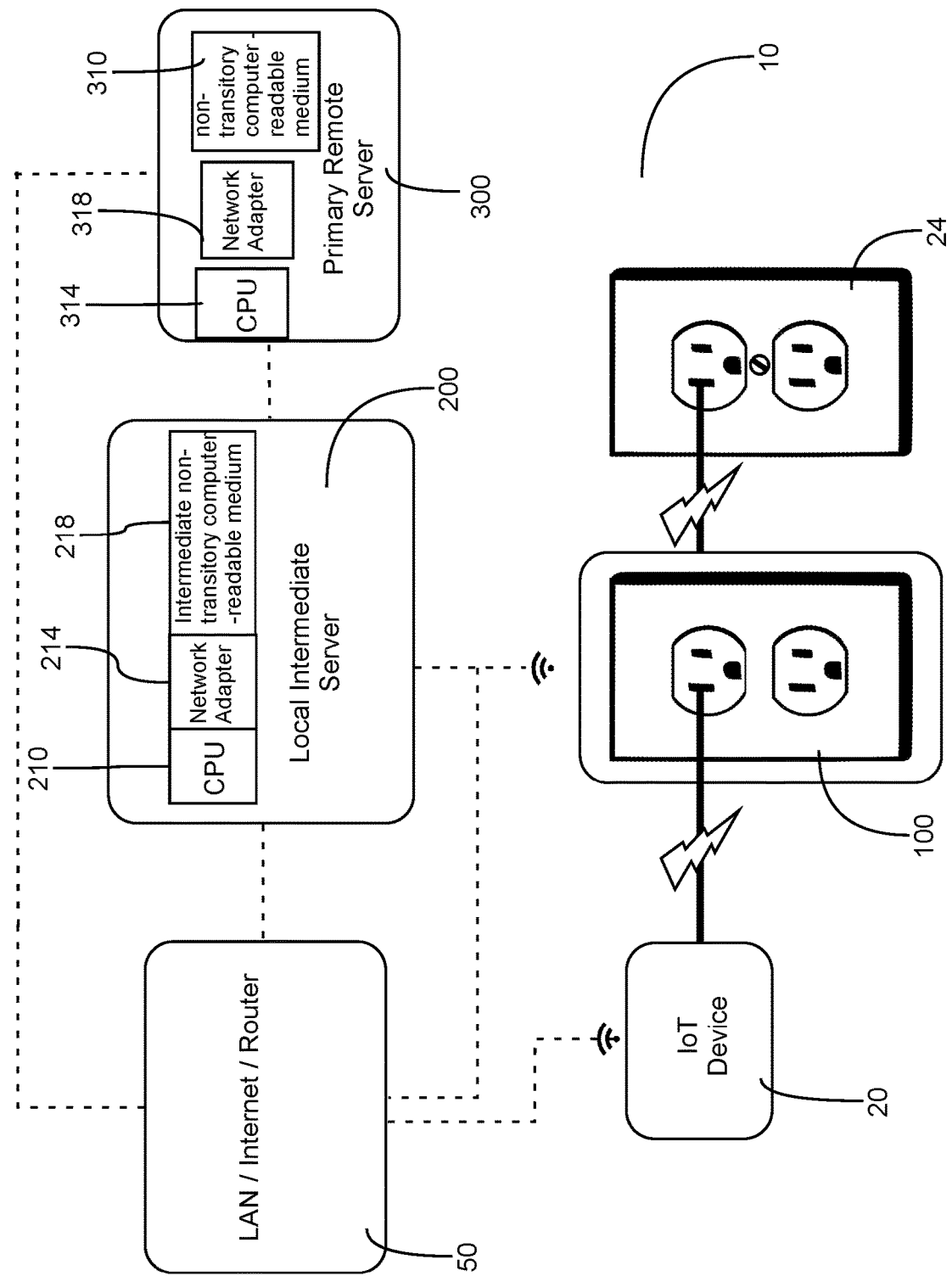
FIGS. 2B-C show exemplary electrical schematics of potential power interfaces between exemplary smart auditors of a bot detection system and an exemplary IoT device in various potential configurations in accordance with various aspects of the present invention.
Figure 2C:
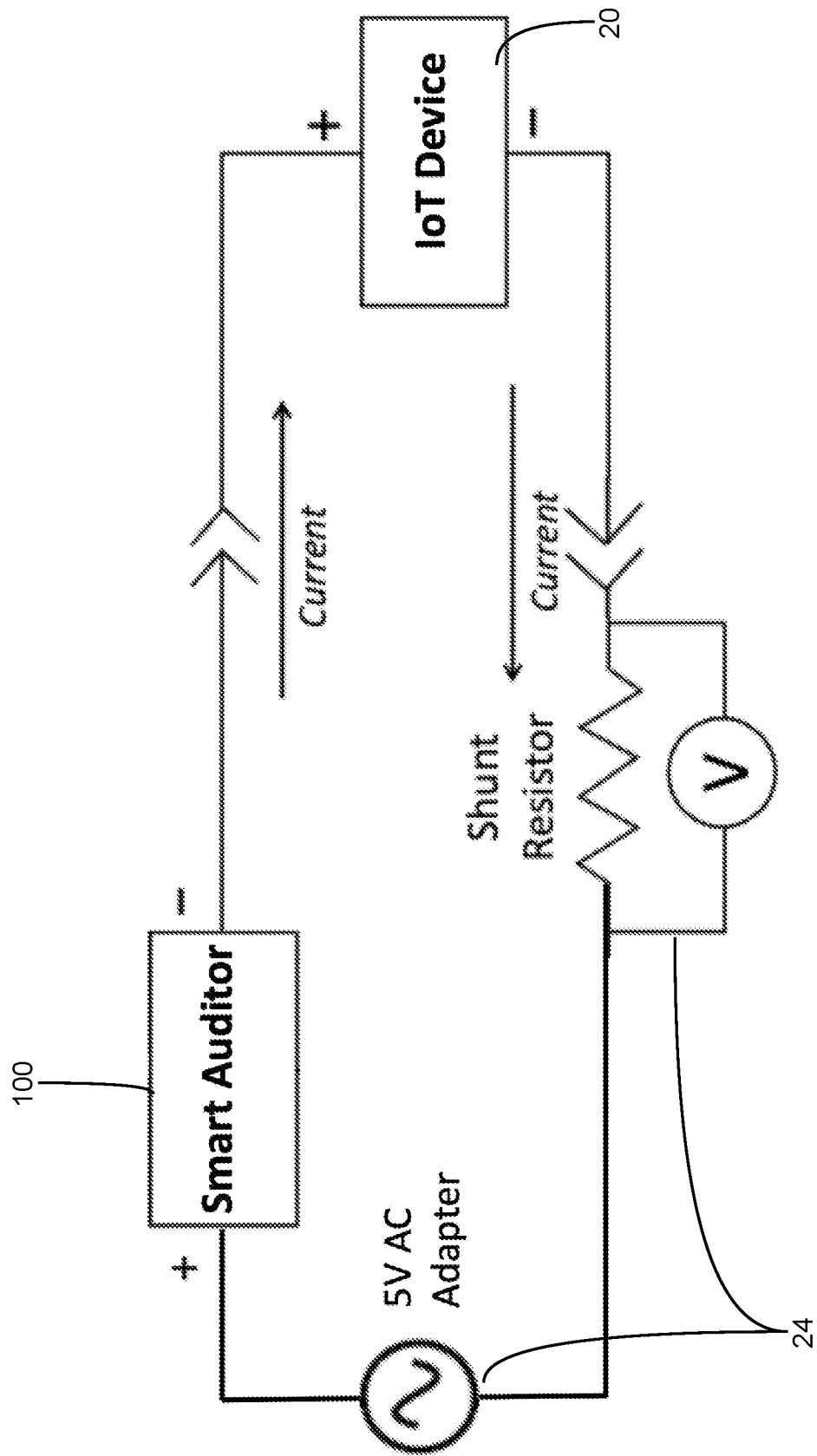

FIGS. 2A-C illustrate an exemplary bot detection system 10. The system 10 can include a smart auditor 100 which can be interfaced with an IoT device 20, and specifically between the IoT device itself and its power supply. This interface can include a power control module 110, and also be provided with the capability to measure power usage characteristics of the IoT device 20. Measurement can be provided by a power data processing unit 114 which can be accomplished via any number of readily ascertainable methodologies, i.e., watt meters, current detection, etc. Additionally, the power control module 110 can have the ability to limit or switch the power off, or otherwise interrupt the power supply to the IoT device 20.

The smart auditor 100 can then be provided with at least some processing capability to compile and transmit the measured data via a networking module 118 which can be configured to receive and transmit the power usage information;

This power usage information can then be transmitted to an intermediate server 200 which can then be utilized to encrypt the power usage information and transmit the information to a primary remote server 300, which can then be utilized to perform computationally complex tasks such as compare the power usage information to a historical database 310 containing IoT power usage signatures associated with various known and normal IoT functions of identical or similar IoT devices.

In some embodiments, the intermediate server 200 can be provided at a local location, such as on or connected to a local network, wherein it can act as an intermediary between the smart auditor and the primary remote server. It will be understood that it can be provided with an intermediate processor 210, local non-transitory computer-readable media containing instructions for execution by the intermediate processor 210, as well as any necessary information for performance of any appropriate method steps discussed herein.

In some embodiments, the primary remote server 300 can similarly include a primary processor or a plurality of remote primary processors 314, which in some instances can be provided as a distributed computing cloud. Similarly, the primary remote server 300 can include a primary non-transitory computer-readable medium 310 which can also contain an IoT power usage database containing historical power usage information of various IoT devices in normal operation modes and know infected operation modes. Similarly, the primary non-transitory computer-readable medium 310 can also contain instructions for the primary processor 314 to perform various tasks necessary for employing the system as discussed. These instructions can include the following instructions: receive information regarding a model of the IoT device; receive information regarding the encrypted current power usage information of the IoT device; compare the current power usage information to historical power usage information correlating to the particular model of the IoT device in both normal operation and in an infected state indicative of malicious bot activity on the IoT device thus generating comparison data; obtain the comparison data in the encrypted form; and transmit, via a network adapter 318, the encrypted comparison data back to the intermediate server.

Similarly, the intermediate non-transitory computer-readable medium of the intermediate server 200 can then contain instructions for the intermediate processor 210 to perform the following tasks: receive the encrypted comparison data from the primary remote server; decrypt the comparison data; communicate with the primary remote server 300 via a network adapter 214, which could be hard wired, for example via ethernet, or alternatively communicate via a suitable wireless communication means; determine indications of bot activity within the IoT device 20 based on comparison data; generate one or more recommended instructions for execution by the smart auditor 100; and transmit one or more recommended instructions to the smart auditor, wherein upon a determination of an infected state of the IoT device 20, at least one recommended instruction being for the power control unit of the smart auditor to interrupt power.

Then ultimately, the smart auditor 100 is configured to execute the one or more recommended instructions received from the intermediate server 200, and can interrupt power utilizing the power control module 110

In some exemplary embodiments the primary remote server 300 can include a convolutional neural network model 400 for classification of the current power usage information from the IoT device 20. It will be appreciated that this is an exemplary implementation and allows for the system to run machine learning operations to track power usage information and update the historical databases so as to recognize and differentiate new bot activity as well as recognize normal power usage patterns that may be alterations of normal IoT functions enabled through IoT firmware updates, etc. However, the database can also be updated manually without machine learning by uploading data from known infected IoT devices, and uploading normal IoT functions and associated power patterns from known non-infected IoT devices.

In some embodiments, the convolutional neural network model can be deployed across the primary remote server and the intermediate server, wherein the primary remote server and the intermediate server are non-colluding.

In yet additional embodiments, the intermediate server 200 can be configured to remove any private identification data regarding the IoT device from all data transmitted to the primary remote server. Similarly, in some such embodiments, the primary remote server 300 can also be configured to remove any model parameters of the CNN from all data transmitted to the intermediate server 200.

In some alternative embodiments, the primary remote server 300 can be provided as a plurality of distributed computing servers so as to allow the CNN computations to be handled by a large number of distributed CPUs.

It should also be appreciated that the smart auditor 100 can be provided between the IoT device 20 and a power source 24. In some embodiments the smart auditor 100 can be provided with a network adapter 118 that can be configured to communicate with the intermediate server, or the primary remote server directly, or through a LAN or Router 50 connected through the internet. In some configurations the smart adapter can be plugged into the power source, where the IoT device is connected through a controlled plug of the smart auditor 100, as illustrated in FIG. 2B.

Alternatively, it will be appreciated that not all IoT devices are plugged into a receptacle, and may be powered using other means from any number of power sources 24. FIG. 2C illustrates the inclusion of the smart auditor 100 along a power supply line of a differently power configuration of the IoT device 20

Figure 3:
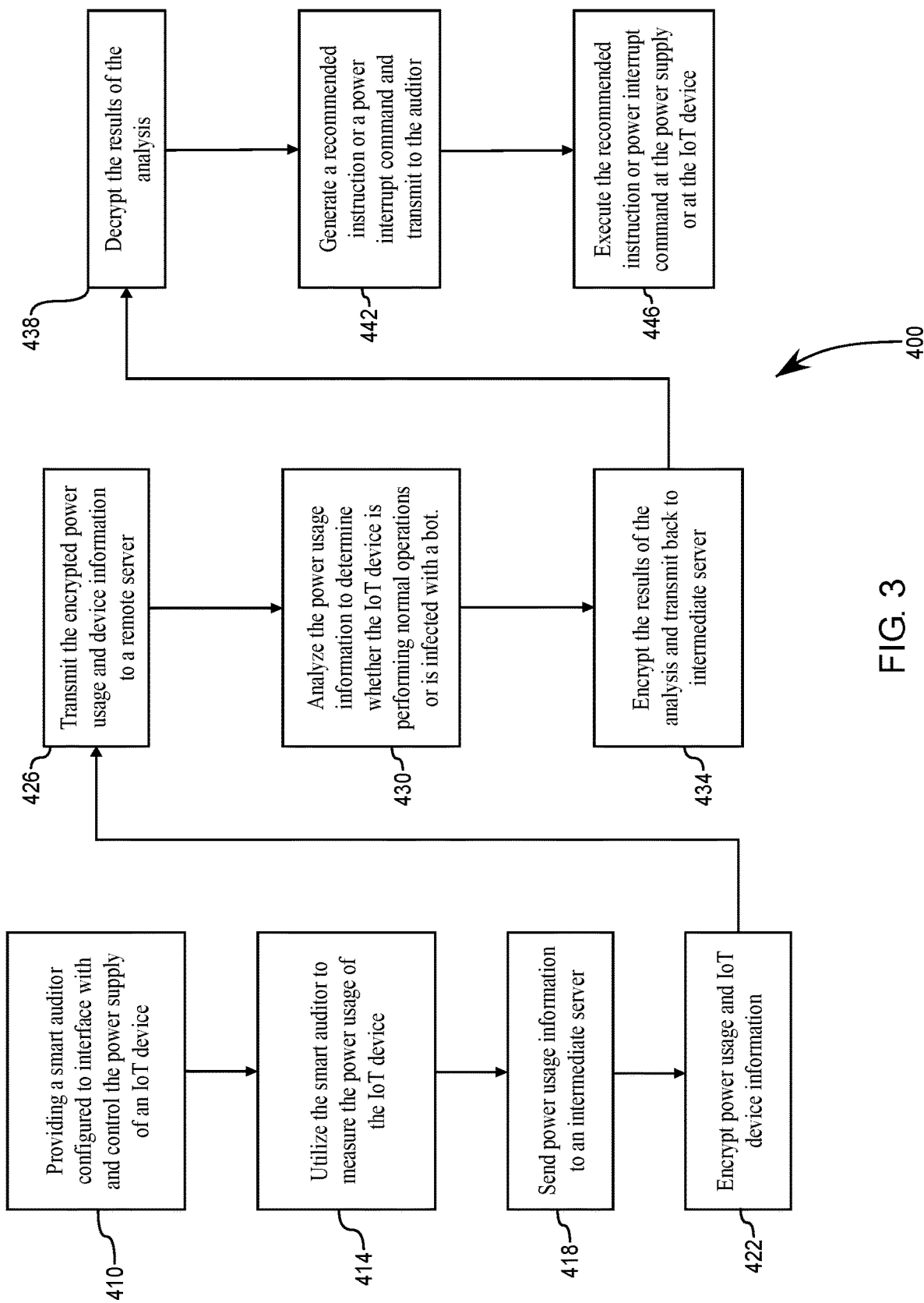
FIG. 3 illustrates a flow chart illustrating various steps which can be implemented by an exemplary bot detection system in accordance with various embodiments of the present invention.

Also contemplated herein is a method for the detection and mitigation of system impact of bots in Internet of Things (IoT) devices, some of the steps being illustrated in the flow chart of FIG. 3. This method can thus include the following steps: providing a smart auditor configured to interface with, and control, a power supply of an IoT device 410; measuring, by way of the smart auditor, current power usage information from the IoT device 414; receiving information regarding a model of the IoT device by the intermediate server; transmitting information regarding the current power usage information of the IoT device from the smart auditor to the intermediate server 418; encrypting information regarding a model of the IoT device at the intermediate server and encrypting current power usage information from the IoT device at the intermediate server 422, to preserve the privacy of the IoT device and its user; and transmitting the encrypted current power usage information and the encrypted information regarding a model of the IoT device to the primary remote server.

Then at the primary remote server, utilizing the primary remote server to perform the following: comparing the encrypted current power usage information to historical power usage information correlating to the particular model of the IoT device in both normal operation and in an infected state indicative of malicious bot activity on the IoT device, thus generating comparison information 430; obtaining the comparison information in the encrypted form at the primary remote server and transmitting the encrypted comparison information from the primary remote server to the intermediate server 434.

Then at the intermediate server, the intermediate server can be utilized in: decrypting, when necessary, the encrypted comparison information at the intermediate server 438;

determining indications of bot activity within the IoT device based on the comparison information at the intermediate server and generating one or more recommended instructions upon determination of bot activity at the intermediate server and transmitting the one or more recommended instructions from the intermediate server to the smart auditor 442; and causing the smart auditor to execute the one or more recommended instructions 446.

In some embodiments, upon determination of bot activity, the one or more recommended instructions can include at least one instruction to interrupt power.

Additionally, in yet additional embodiments of the method, the method can include a step of removing any private identification data regarding the IoT device from all data transmitted from the intermediate server to the primary remote server. Similarly, in some such embodiments, the method can include a step of removing any model parameters of the convolutional neural network from all data transmitted from the primary remote server to the intermediate server.

In order to provide context for various functionalities an exemplary implementation will be discussed in which a privacy-preserved online IoT botnet detection system was built and tested, wherein the system was able to differentiate malicious bot attacks from normal IoT behavior by analyzing side channel power usage patterns. The system can include one or more smart plugs connected to IoT devices as well as distributed computing servers for online classification. In this system, a smart plug and measurement device were combined so as to form the smart auditor that measures power consumption and transmits the power traces and patterns to the remote server for runtime analysis. At this server, a 7-layer Convolutional Neural Network (CNN) model was provided for online classification.

This CNN model was partitioned and deployed in two non-colluding servers, the data inferencer or intermediate server 200 and the computing cloud or primary remote server 300, to offload the computing requirements of the CNN inference computations to more capable means of performing them.

In order to protect the private data from IoT devices, the present system can also be configured to include a privacy-preserved protocol via Packed Homomorphic Encryption (PHE). This protocol is secure assuming a semi-honest model. Specifically, the computing cloud or primary remote server 300 is then not permitted to learn IoT private data received from the data inferencer or intermediate server 200, whereas the data inferencer or intermediate server 200 similarly is not permitted to learn the model parameters held by the computing cloud or primary remote server 300.

In order to accomplish this, the system is configured to first validate the classifier performance from an exemplary offline dataset. Then, the system was tested to provide real-time system performance results in an exemplary test-bed as well. The results demonstrate that the present exemplary system is able to detect malicious bot behavior in real-time without data leakage.

As discussed above, a 7-layer CNN classifier is provided for malicious behavior detection in the cloud. This classifier is implemented into the data inferencer or intermediate server 200 and the computing cloud or primary remote server 300 servers, i.e., primary remote servers 300, for online classification to offload CNN inference computations.

In some embodiments of the present invention, a security protocol for the partitioned CNN model can be deployed across each of the non-colluding servers. This protocol preserves the data privacy of IoT devices while protecting the CNN model parameters of the cloud.

Figure 1B:
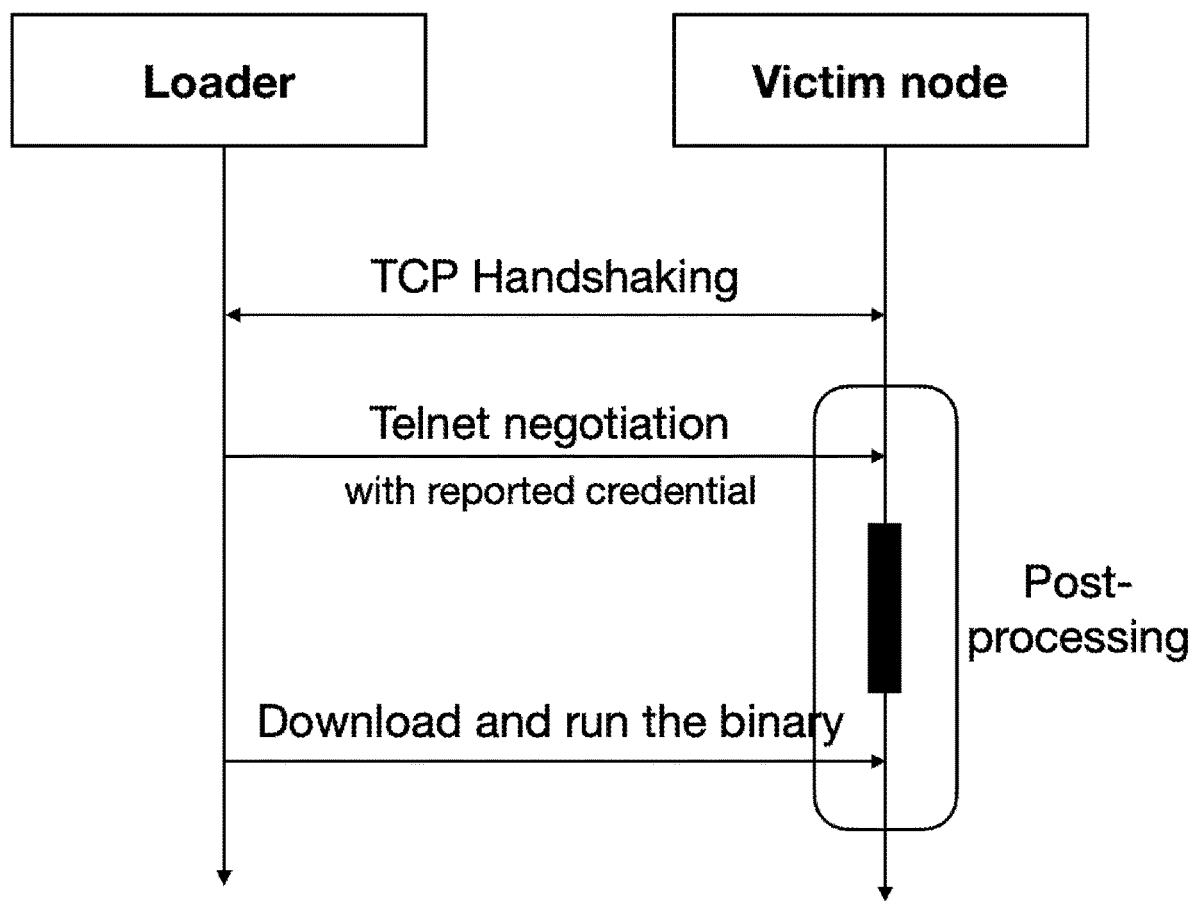

FIG. 1A shows how Mirai and its variants develop a vast botnet within a short period of time. First, as shown in FIG. 1A, an attacking bot randomly scans a victim node using telnet. The attacking bot uses a brute force attack to get into the victim node. It is an attack that tries to sneak into the device via using different username/password combinations, which is possible because many IoT devices retain default account settings. Once the attacking bot successfully logs in, it reports the device's credential information to the Loader server. As shown in FIG. 1B, the Loader server then accesses the victim device to perform post-processing jobs. The post-processing jobs often consist of killing other suspicious processes, finding a writeable directory, checking the device's architecture type, and uploading the architecture-specific bot binary to the IoT device. Once installed, the IoT bot in the victim node behaves the same as an attacking bot, scanning other devices.

Despite the clear procedures of a botnet attack, it is not easy to recognize whether this intrusion happened. This is because scanning devices occurs every day, and the network traffic generated by this intrusion is not significant. However, after this incubation period, a vast number of IoT bots receive a command simultaneously from a control server to attack a target. By the time a massive attack is occurring, it is too late to guard against this large volume of traffic. Therefore, it is crucial to detect IoT botnet behavior in IoT devices as early as possible.

The system disclosed herein can then be configured to determine the propagation procedures of Mirai and its variants, as shown in FIGS. 1a and 1b. It has then been further recognized that the power side-channel information generated by Mirai is different from the device's own traffic.

Moreover, Table I, as shown in FIG. 1C, summarizes that all malicious bots have similar intrusion methods and post-processing jobs. Although their target devices and the post-processing jobs are slightly different, all of them use the brute force attack. Moreover, Mirai and its variants generate similar power traces in their propagation periods and their post-processing jobs.

In the present exemplary system, the system was trained to recognize power traces generated by well-known IoT botnets. However, in some embodiments the system can be further designed to detect a diverse set of botnets beyond those that are well-known, as it can be assumed that an adversary is capable of conducting various patterns of botnet attacks. Thus, in some aspects of the present design two possible avenues are considered that the adversary can use to attack a given client-side: 1) Exploit vulnerabilities of smart auditor that measures power consumption. 2) Generate complicated post-processing jobs. Adversaries could perform complicated or different jobs that generate unseen power patterns. For instance, downloading multiple binaries, connecting to multiple servers, or rebooting the infected device can create more complicated power traces. In order to address the first case, the present exemplary system can be configured so as to assume that a smart auditor which is configured to monitor power consumption does not allow unknown inbound traffic from remote sources. Meanwhile, the system can include, and directly connect to, a smart auditor in conjunction with an IoT device to measure its power consumption. This assumption is further validated particularly when considering that existing smart plugs do not allow users to access ssh/telnet services. Instead, these smart plugs are mostly managed by manufacturer apps. To address the post-processing job side, segmented data from different patterns can then be trained as botnet instances in a deep learning model integrated into the system. Thus, as long as power side-channel information is noticeable enough to label, the CNN model is able to learn and detect even more complicated patterns.

Furthermore, adversaries could also target a target's cloud servers. Considering that the system can be configured so as to implement the aforementioned classification model into two cloud-based edges. The system can then assume any user-hold application and model-hold server in a test or target system can become a semi-honest adversary. That means they follow the system privacy policy, but they may also try to learn additional information from their received messages. For example, a server may try to learn smart auditor data based on the user input, and the user tries to inference the server's model parameter based on the server output. The system can be configured so as to consider all parties non-colluding for their input data and output data. In this way the present exemplary system can then be configured so as to avoid user's privacy data disclosure that leads to poor credibility.

The emerging attack is also a threat the system can be configured to consider in its corresponding models. In such a model a User-side can launch the model extraction attack to extract the convolution layer and fully connected parameters based on the server received message. The server can process membership inferences attack to compare the user input with the server's pre-trained dataset. In such exemplary circumstances, the privacy-preserving mechanism of the present exemplary system can then mask the intermediate/final output for both user and server. However, the user still can learn the correct predicted result. Simultaneously, the privacy-preserving mechanism of the present exemplary system can then protect the server holds model parameters from the user, and user input is oblivious with regard to the server. The system can then be configured to apply a flexible method to protect the output correctness and prove system security by using a real-ideal paradigm, as discussed in more detail in below.

As illustrated in another exemplary embodiment of the present system, FIGS. 2A-C illustrate an overview of the system 10. The present exemplary system consists of three subsystems—smart auditor 100, Offline Trainer housed in the primary remote server 300, and a Privacy-Preserved Online Classifier which is deployed either on the intermediate server 200 and/or on the primary remote server 300. In user site, there could be multiple smart auditors for the corresponding IoT devices, while Privacy-Preserved Online Classifier covers the user site's multiple smart auditors. Offline Trainer creates and trains a CNN model based on the user's labeled data.

The present exemplary system can thus utilize universal hardware of the smart auditor 200 to sense the IoT 20 device power data and manage power supply to the IoT device 20 as discussed below. The proposed smart auditor 100 can then be connected to each IoT device in a given environment. First, it is capable of auditing power consumption footprint by the Power Data Processing module. The Networking module can be configured to communicate with the data inferencer or intermediate server 200 in user site. For offline training, the smart auditors 100 can also be configured to provide labeled data to the Offline Trainer. Note, that any offline labeling can be done manually by a user administrator. Then, the pre-trained classifier can be deployed in the cloud for the online phase. During the online phase, smart auditors can be configured to transmit segmented data to the data inferencer or intermediate server 200 and receive the classified label. Depending on the classified label, smart auditors can then be configured to shut off the power supply to the connected IoT device.

Moreover, as the system can be configured to include a 7-layer CNN model for classifying power trace data. This CNN model can take one-dimensional input data, which can include a power trace of an IoT device, for online classification. Given the input data, the CNN classifies whether the input is malicious or not.

Based on the proposed CNN model, the CNN model of the present exemplary system can be implemented and partitioned into the data inferencer or intermediate server 200 and computing cloud or primary remote server 300 so as to offload computations, which will be discussed in further detail below.

The data inferencer or intermediate server 200 can then be configured to run on a locally hosted user site for online classification. This module can then receive power traces from the smart auditor(s) and encrypt the data when communicating with the computing cloud or primary remote server 300. The computing cloud or primary remote server 300 can then, for purposes of illustration, be located in cloud and be responsible for the homomorphically computable functions to offload the CNN inference computations. The computing cloud or primary remote server 300 can also handle non-homomorphically computable functions, i.e., nonlinear activation computations in the CNN. Furthermore, as it is undesirable to leak the user's data to the cloud, the system design allows for a privacy-preserved protocol to protect private data from IoT devices. Working together, the data inferencer or intermediate server 200 and the computing cloud or primary remote server 300 of the present exemplary system can be utilized to implement an exemplary 7-layer CNN for IoT bot detection in real-time, while fully protecting the data privacy of the IoT devices.

In one exemplary embodiment, three modules were introduced for use inside the system's smart auditor—Data Processing, Networking, and Power Controlling, as illustrated in FIG. 2. First, the power data processing module which can measure the power consumption trace of an attached IoT device. The networking module which can communicate with the server-side to convey the sensing data for online classification. The power controlling module which can supply power to the connected IoT device or shuts off the power in case the IoT device is being attacked.

Figure 6:
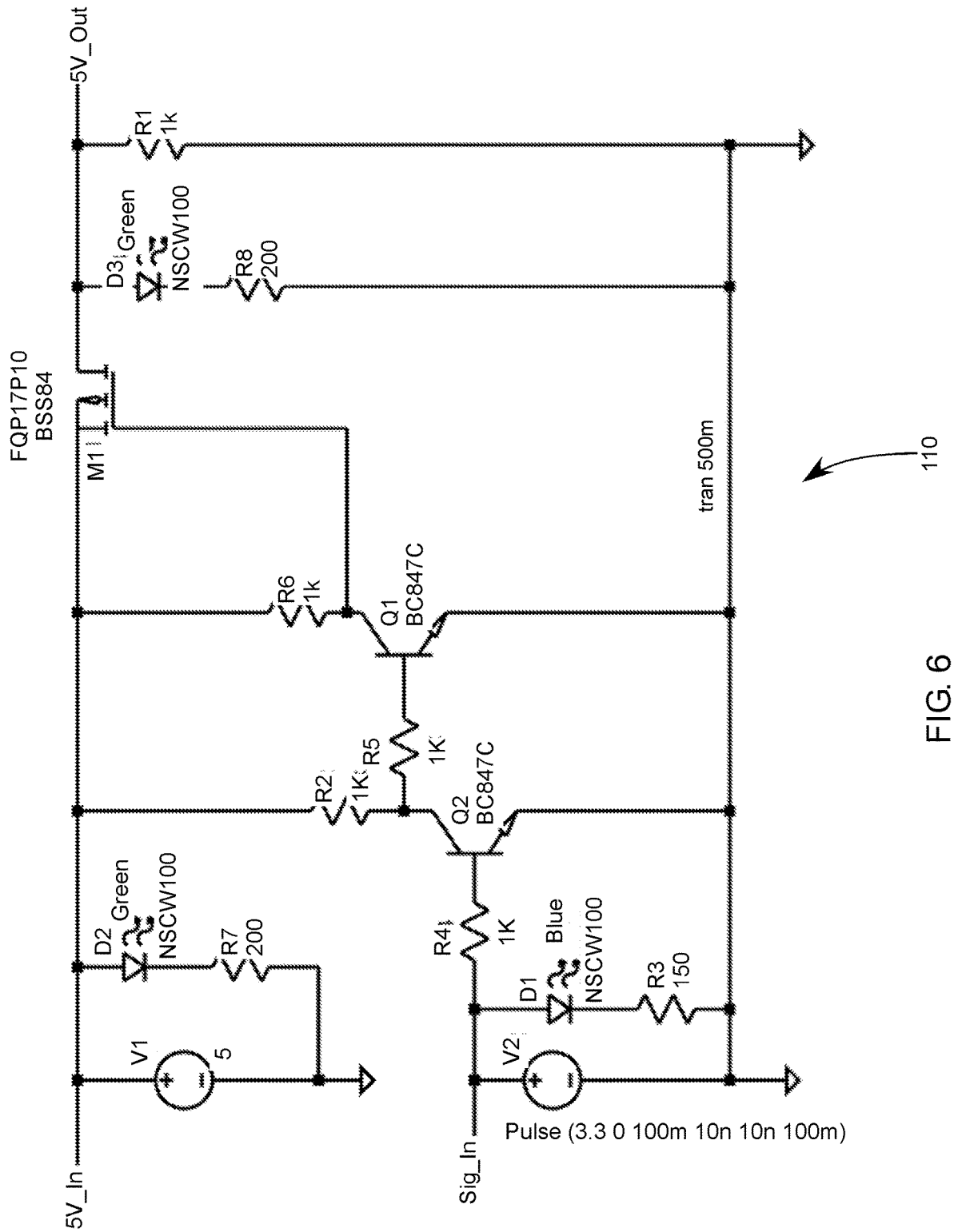
FIG. 6 illustrates an electrical schematic of an exemplary power control circuit which can be employed within an exemplary smart auditor in accordance with various aspects of the present invention.

To measure the power consumption of an IoT device, the system can implement a circuit with a current sensor. FIG. 6 shows a circuit for the power data processing module 110. As shown, the system can use an AC adapter to output 5V to the smart auditor like many IoT devices. The smart auditor can thus bypass the fixed voltage to the IoT device. To get the current and voltage reading on the connected IoT device, the system can use a current sensor, for example an INA219. This sensor includes a shunt resistor and provides ADC conversion to the smart auditor. In this circuit, the smart auditor can thus measure the voltage drop around the shunt resistor at a high frequency. Based on this data, the system can then calculate the current values going through the entire circuit. By doing so, the system can measure the power consumption of the connected IoT device.

In addition, for this exemplary sensor, for purposes of discussion, the system was provided with the following specific parameters, which can be altered in accordance with various situations, as such, the sampling rate of the current sensor was set at 1.7 kHz, so the corresponding number of data points was 1700 per second. This is high enough since power data over a 512 Hz sampling rate still guarantee high classification accuracy. After measuring power data, the Power Data Processing module pushes every power reading into a local queue. Then, the Networking module can fetch the queued data periodically to transmit them to the online classifier.

The networking module is an interface between the system's the smart auditor and the data inferencer or intermediate server 200. For the purposes of discussion, the system can then be exemplarily configured to use TCP for packet transmission for this interface. This module fetches power reading data from the local queue and then assembles the collected data to a TCP packet for online classification. It has also been discovered that Mirai and its variants have similar time distributions during the propagation period, which is less than 1.5 seconds. Note that this invasion time may vary depending on systems or botnets. However, as long as it is noticeable for Offline Trainer to label, a window size would not be an issue. Thus, the system in this exemplary embodiment, as applied for Mirai detection, can utilize a window size of 1.5 seconds for botnet classification input.

Figure 4:
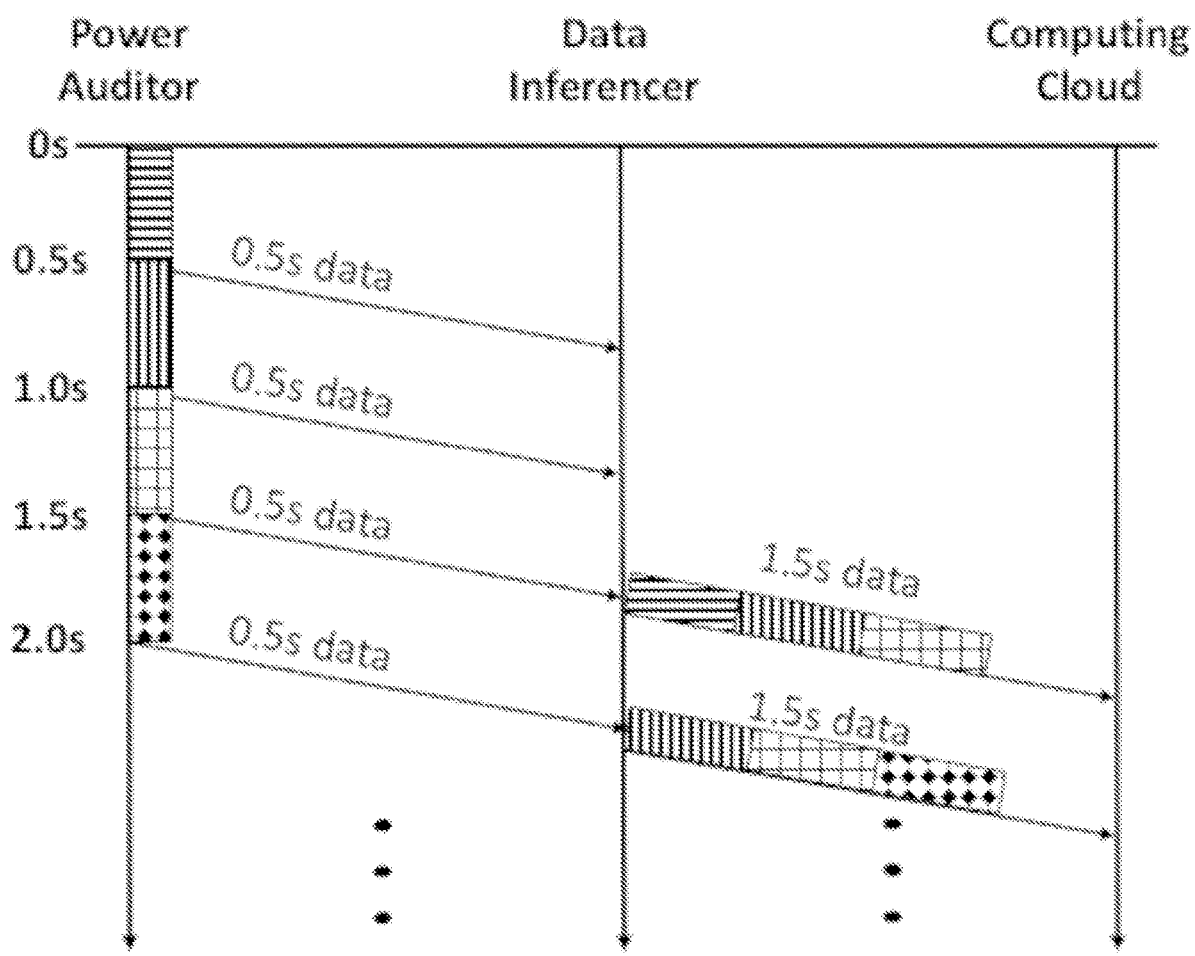
FIG. 4 illustrates a schematic representing an overlapping sliding window scheme for handling of the transmission of data packets in an exemplary deployment of the system in an exemplary testbed in accordance with various aspects in the present invention

Next, the system can be configured to apply a sliding window with one-third overlapping for better classification accuracy. This is because bot instances could be truncated during offline labeling and online capturing. By using the overlapping sliding window, the deep learning classifier can train various patterns of power traces, including truncated bot instances. FIG. 4 illustrates an overlapping sliding window scheme in the present exemplary system. If a smart auditor transmits a data packet of 1.5 seconds every 0.5 seconds, this will create redundant packets. Instead, the smart auditor reads 0.5 seconds of data and transmits it once collected. The data inferencer or intermediate server 200 in such an instance then receives the packet every 0.5 seconds. After receiving three consecutive packets, the data inferencer or intermediate server 200 assembles the last three packets and feeds them into the classifier. By doing so, the system effectively implements the sliding window scheme, avoiding unnecessary network redundancy.

Accordingly, the present exemplary system can also implement an interface format between the smart auditor and the data inferencer or intermediate server 200 to deliver the collected power instances. Table II, as illustrated in FIG. 5A, depicts the packet header format. The number of data points is determined based on the following values. For example, in one exemplary implementation in which the sampling rate is 1700, and the window size is 1.5 seconds. Consequently, the number of data points in a single instance for classification is 1700×1.5=2550. In this instance the system is configured to adopt the server-side sliding window scheme, the smart auditor also set the Sliding Window Ratio header to 3. Finally, the number of data points in a single TCP packet will be 2550+3=850 in this exemplary implementation. The body contains a list of power sensing data. FIG. 5B describes an example of the actual TCP packet data.

In the smart auditor as contemplated herein, the system can be configured to add an ability to manage the power of a connected IoT device. Since a smart auditor supplies power to the connected IoT device, it is also able to timely shut off the power in case an attack or abnormal behavior is being detected.

FIG. 6 shows an exemplary proposed power controlling module 110. In this embodiment, there is provided a FET-based switch to turn on the connected IoT device via GPIO from the smart auditor device, as shown in FIG. 6. FIG. 6 then illustrates the schematic of the circuit where 5V input (5V IN) can be provided from smart auditor. SIG IN (GPIO IN) from smart auditor is used to shut the circuit on and off.

When the GPIO pin is low, smart auditor supplies power to the connected IoT device, which is normal usage. On the other hand, when the GPIO pin (SIG IN) is high, the power supply to the IoT device is shut off. For example, 3.3V input from GPIO turns on Q2 thereby turning Q1 off. With Q1 off, R6 will pull the gate of the PMOSFET (M1) to 5V. The result is Vgs=0V, which turns M1 off. Note that in this embodiment, the current draw of this module is only 20 mA when the 5 v output is being provided. Moreover, the maximum current through this module is up to 16 A. Therefore, the proposed module enables smart auditor to manage power to the connected device without significant overload.

Figure 7:
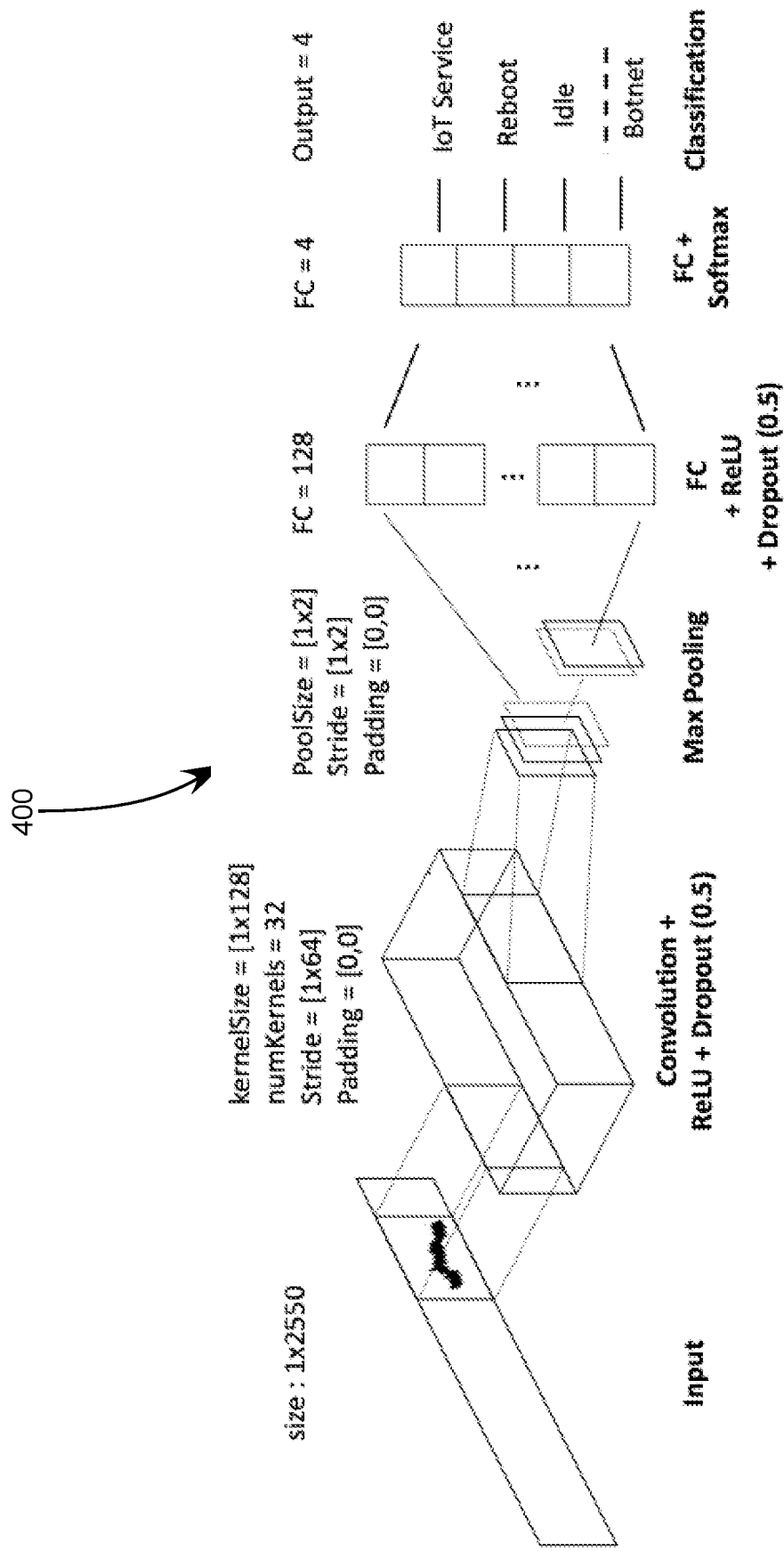
FIG. 7 illustrates a schematic of an exemplary convolutional neural network which can be employed by one or more of the bot detection systems contemplated herein in accordance with various aspects of the present invention.

Discussed here is a CNN-based botnet classifier for IoT devices. While the CNN model of the present exemplary system is exemplarily deployed in two non-colluding units, i.e., the data Inferencer or intermediate server 200 and the computing cloud or primary remote server 300, can be implemented utilizing an alternative method and arrangement which can include a logical CNN model, as shown in FIG. 7.

In this embodiment, before feeding data, the system can prepare input data for the classifier. During the data preprocessing, the system can first segment power consumption data and normalize it. This is because the ranges of power consumption instances vary, which may cause widely-spread features and thus negatively impact training and test results. As explained earlier, segmentation is conducted in smart auditor to reduce network redundancy. When the data inferencer or intermediate server 200 receives three consecutive packets from the smart auditor, it simply normalizes the received power reading input before feeding it into the CNN.

In some potential embodiments, the system can aim to model botnet detection for heterogeneous devices. In this embodiment the system was configured to modify several hyper-parameters, adjusting them for use by the system due to the different sampling rate, such as input size and kernel size. In this embodiment, the system also excluded the batch normalization layer because had already been configured to normalized the input vector in the pre-processing. Overall, the changes are minute while still having decent results.

The input layer prepares one-dimensional input prior to the convolution layer. Since the present exemplary system takes power consumption data, every single input instance consists of one-dimensional power trace data points. In this embodiment of the system, the sampling rate of the power sensing module is 1.7 kHz, and the length of a single-window is 1.5 seconds. Thus, the input instance size for the corresponding CNN model is (1×2550). Wherein the system was also configured to use ten one-dimensional (1×128) kernels, and the stride size being 32. In some embodiments, it was recognized that is not useful to have small size kernels since the sampling rate is pretty high. Thus, for this embodiment 128 as a kernel size was utilized, which means about a power trace of 75 milliseconds under the sampling rate 1.7 kHz. Besides, the stride size moves one-quarter of each instance to learn more features. Consequently, the convolution layer computes a dot product between the power consumption data of 75 milliseconds and the kernels.

Although one purpose of the present exemplary system is to detect whether the connected IoT device is being attacked, the system can also be configured to capture other behavior. As a result, the classification layer has four classes, which are Idle, IoT service, Reboot, and Botnet classes, to represent the behavior of each IoT device.

As discussed earlier, the classifier of the present exemplary system can be configured to predict a given power instance whether it is one of the four classes. Thus, in an exemplary instance the system was configured to collected power-trace instances and created a new dataset with the system's smart auditor. Then, the system was configured to label the collected instances so as to allow the system to train the weights and biases of the system's CNN model. Table III, as shown in FIG. 8A, illustrates the collected dataset from the present exemplary system environment. The system was then utilized to generate a specific scenario and collect power instances over 2000 for each class. For example, in this exemplary employment the system collected 4693 instances of 1.5 seconds data while the IoT service was not running for the Idle class. The system then also collected power traces while the IoT service was running or when the IoT device was rebooting. For the Botnet class, the system utilized previously downloaded and open-source versions of Mirai from Github and built them on an IoT bot device. To generate Mirai instances in the local network, the system utilized a modified source code so as to target various IoT devices. Then, in this employment the system generated 3000 instances of malicious attacks while the IoT service was running or the system is Idle.

Evaluation Results: An exemplary instance was then conducted using offline classification to demonstrate the validity of the CNN model. The system ran a 5-fold cross-validation test. Accordingly, the system divided the collected dataset into five subsets. Then, the system was trained using four subsets and tested on the remaining subset. This procedure was then repeated so as to calculate the total accuracy. With this newly collected dataset, the overall accuracy of the classification was about 99.19%. In the evaluation users then calculated Recall, Precision, and F1-Score, and the values are 99.70%, 99.20%, and 99.45%, respectively. Table IV, as shown in FIG. 8B, illustrates the confusion matrix of the offline classification. Each class shows a good classification accuracy with low false-positive rates. Overall, this offline result of the system's classifier is better than the state-of-art research with a larger dataset collected by smart auditor, which demonstrates the feasibility of the system's current classifier.

In some exemplary embodiments, a privacy-preserving mechanism can be implemented, for the present exemplary system. In this implementation, it can be assumed the data inferencer or intermediate server 200 is a user-running application designed for the computing cloud or primary remote server 300. In this embodiment the data inferencer or intermediate server 200 can then be configured to hold the smart auditor's raw data, and the computing cloud or primary remote server 300 can be configured to hold the CNN model. In this embodiment, the system was configured to utilize PHE so as to allow the data inferencer or intermediate server 200 to encrypt the IoT data before uploading it to the computing cloud or primary remote server 300, and enable the latter to run the CNN model on the ciphertext. It can then be utilized to encode multiple plaintext data elements into one ciphertext, and highly efficiently carries out element-wise homomorphic computation in a Single Instruction Multiple Data (SIMD) manner. This tool is particularly useful for this exemplary system as each input can potentially include thousands of sampling data due to the large sampling rate. The present embodiment uses the CKKS-based PHE that works on float point data addition and multiplication in ciphertext.

In some instances, the IoT Device 20, the data inferencer or intermediate server 200, can be configured take further actions, such as letting smart auditor cut off the IoT device's power or sending a notification to the administrator.

In some implementations it has been recognized that it is often advantageous to separate multiplication and summation in the convolution and fully connected layers. The objective here is to avoid the time-consuming permutation operation in the convolution and fully connected layers. Specifically, computing cloud can be configured to carry out the multiplication operation in the ciphertext, while the data inferencer or intermediate server 200 can instead be configured to conduct the summation operation to complete the convolution or fully connected layer computing.

The privacy-preserved inference protocol for an exemplary proposed CNN model is described in Protocol 1, as illustrated in FIG. 9A. In this exemplary embodiment the system can be configured to use a CNN model with a 1D convolution layer, a ReLU activation, a 1D average pooling, flattening, and a fully connected layer as an example to explain the main idea of the present exemplary embodiment's protocol. Let X denote the received raw data by the data inferencer or intermediate server 200 from smart auditor. The PHE package uses one packed vector to store multiple encrypted plaintext data. It only supports element-wise addition and multiplication operations. In order to implement the convolution function over ciphertext, in Step 1, the data inferencer or intermediate server 200 first encodes data X to X', as illustrated in FIG. 9A. Correspondingly, the computing cloud or primary remote server 300 encodes the weight $W_1$ and bias $B_1$ into packed vectors W', B' in Step 2, as illustrated in FIG. 9A. With such encoding, the convolution between X and W can be implemented as the element-wise multiplication between X' and W', plus B'.

Steps 2 and 3 show how the present system securely implement the convolution layer among ciphertext. After The computing cloud or primary remote server 300 receives ciphertext $[X]_C$ from the data inferencer or intermediate server 200, The computing cloud or primary remote server 300 uses Eq. (1) to compute the homomorphic multiplication result.

$$[U]_C = K_1 \times W' \times [X']_C + K_1 \times B' + N_1 \qquad (1)$$

Figure 9B:
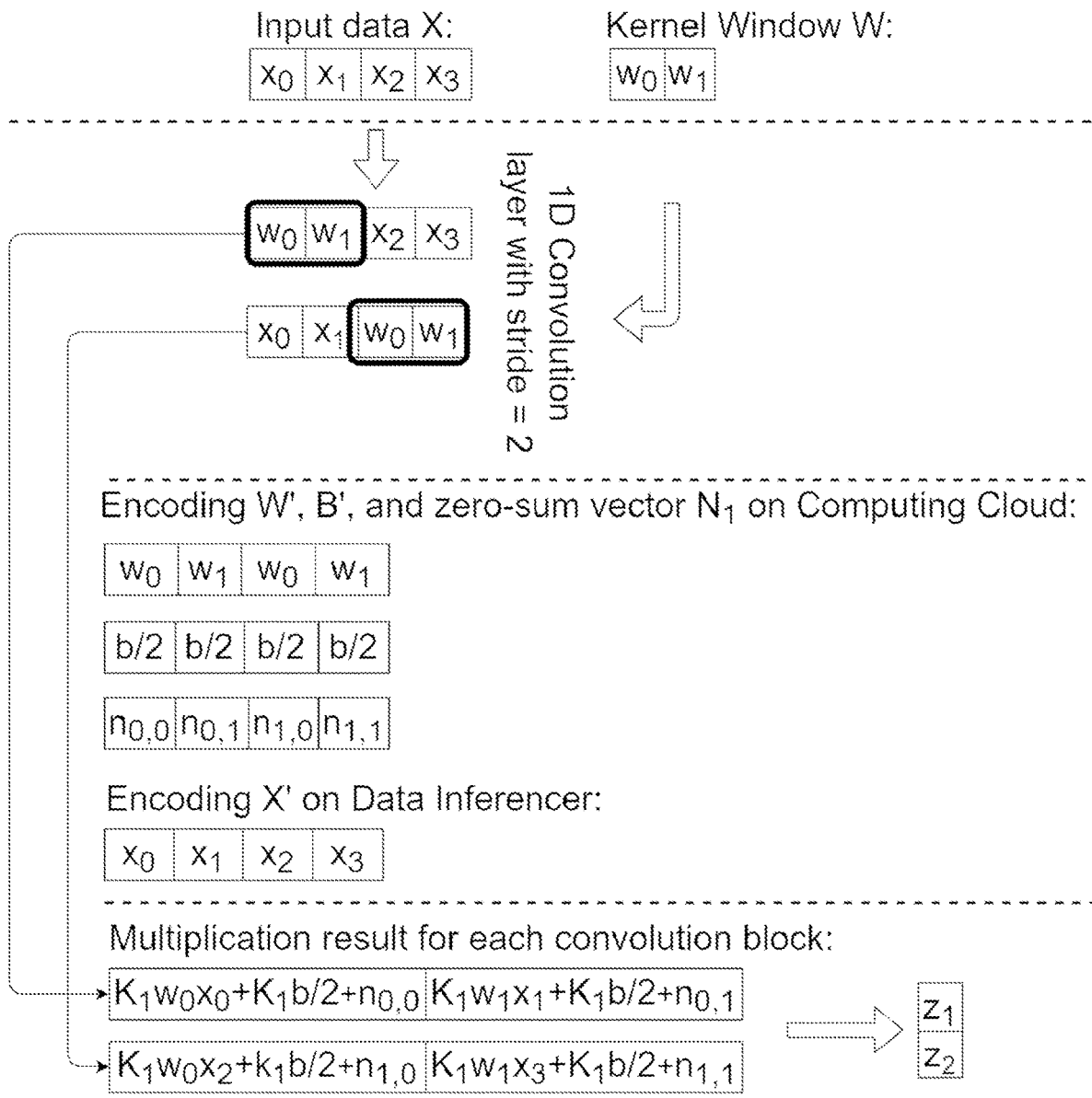
FIG. 9B shows other exemplary computational protocols employable by the CNN of FIG. 7 which can be employed by an exemplary CNN or bot detection system employed by the systems contemplated herein.

The purpose of using random numbers $N_1$ and $K_1$ in Eq. (1) is to prevent the data inferencer or intermediate server 200 from inferring the model parameter W'1 from its received message $[U]_C$. The computing cloud or primary remote server 300 first generates a zero-sum vector $N_1 \in \mathbb{Z}$, which is a group of pseudo-random numbers such that $N_1 = \Sigma_{j=0}^{1} n_{i,j} = 0$ ($0 \leq j \leq 1$) to mask each multiplication result, as illustrated in FIG. 9B. Then, the computing cloud or primary remote server 300 multiplies a non-zero positive random number $K_1$ to mask all multiplication results. With both masks $N_1$ and $K_1$, the data inferencer or intermediate server 200 is unable to learn the parameter W'1 and B'1 based on $[U]_C$ and X'. Note that in this particular embodiment $N_1$ and $K_1$ are different for alternative kernels in the convolution. Finally, computing cloud or remote primary server 300 sends the multiplication result $[U]_C$ to the data inferencer or intermediate server 200.

Steps 5 and 6 are similar to Steps 2 and 3 but implement the fully connected layer. However, the computing cloud or primary remote server 300 only requires choosing a single non-zero positive random number $K_2$ in Step 5 to mask the ciphertext multiplication result. At the end of Step 6, the data inferencer or intermediate server 200 directly feeds the weighted sum result of the fully connected layer (see FIG. 7) into the softmax layer to infer the smart auditor status I. If the I value represents that there is a malicious intrusion on the IoT device, The data inferencer or intermediate server 200 can take further actions, such as letting smart auditor cut off the IoT device's power or sending a notification to the administrator.

This exemplary embodiment illustrates that the classifier is secure in that: 1) The computing cloud or primary remote server 300 cannot obtain the client data, 2) the data inferencer or intermediate server 200 cannot obtain the model parameters W and B of the CNN model in the computing cloud or primary remote server 300. Hence, there is no information leakage between the computing cloud or primary remote server 300 and the data inferencer or intermediate server 200.

The system can then be configured to use a security analysis method called the simulation approach for the security analysis. The system can be configured to assume Adversary A can compromise either the computing cloud or primary remote server 300 or the data inferencer or intermediate server 200. Adversary A forwards the encoded input $X^-$ to the present exemplary system. Simultaneously, for the ideal interaction, Adversary A forwards $X^-$ to a trusted functionality machine $f$ with the same model structure and parameters. f is non-colluding with Adversary A. In order to show that the real output is computationally indistinguishable from the ideal output. The analysis is then shown in detail as follows:

In some exemplary embodiments, it was assumed that the data inferencer or intermediate server 200 is compromised by Adversary A. The simulator sim was then configured to behave as Adversary A. The sim, f and the computing cloud or primary remote server 300 conduct the following steps:

Sim encodes the input data into a packed plaintext X' based on the convolution block. Then, sim encrypts it as $[\overline{X}']_{sim}$. Finally, it forwards $[X']_{sim}$ to The computing cloud or primary remote server 300 and f. 2) The computing cloud or primary remote server 300 and $f$ compute the ciphertext multiplication result $U=[K_S W' \ [\overline{X}']_{sim}+K_s B+N_S]$ and $V=[K_f W' \ [\overline{X}']_{sim}+K_f B+N_f]$ by Eq. (1).

$K_S$ and $K_f$ are random numbers selected by the computing cloud or primary remote server 300 and $f$, respectively. Similarly, $N_S$ and $N_f$ are the zero-sum vectors selected by the computing cloud or primary remote server 300 and f, respectively. After that, the computing cloud or primary remote server 300 and $f$ send $[U]_{sim}$ and $[V]_{sim}$ to sim. 3) sim decrypts $[U]_{sim}$ and $[V]_{sim}$, and computes the summation result Z and Z.

Next, it will be understood that the privacy-preserved protocol is secure against the semi-honest Data Inferencer or intermediate server 200. Adversary A first analyzes the intermediate results U and V. The computing cloud or primary remote server 300's output U is computationally indistinguishable from $f$'s output V because the random numbers $K_S$ and $K_f$ are uniformly distributed in Z>0, and $N_S$ and $N_f$ are uniformly distributed in Z. It is hard for Adversary A to learn random numbers $K_S$ and $N_S$ based on U and V.

Next, Adversary A can analyze the final convolution result $\overline{Z}$ and Z. Let * represent the convolution function. Adversary A can view both the convolution result $\overline{Z}=[K_S([K_S*W*X+K_S*B]=[K_S(W*X+B)]$ from the computing cloud or primary remote server 300 and $Z=[K_f([K_f*W*X+K_f*B]=[K_f(W*X+B)]$ from $f$. However, the computing cloud or primary remote server's 300 output $\overline{Z}$ is computationally indistinguishable from f's output Z because the random number $K_S$ and $K_f$ are uniformly distributed in Z>0. It is hard for Adversary A to reveal the model parameters W and B based on $\overline{Z}$ and Z.

In summary, the classifier is secure in the convolution layer computation. Similarly, it is not hard to show that the classifier is also secure on the fully connected layer computation. As a result, the system as proposed here is secure against the semi-honest data inferencer or intermediate server 200.

Similarly, in a particular embodiment, for purposes of testing, one can assume the computing cloud or primary remote server 300 is compromised by Adversary A. However, the illustrated exemplary system is secure against Computing Cloud because Adversary A cannot reveal the data inferencer or intermediate server 200's input data X from $[X']_C$, based on the fact that the PHE transmitted data is semantically secure.

To evaluate the present exemplary system's performance, a prototype was implemented in Python System Environment.

Table V, as illustrated in FIG. 10A, describes various testbed environments. A Raspberry Pi 3 device was utilized for smart auditors and IoT devices since it is widely used for IoT prototyping purpose. The system can then also use a Unix server for the data inferencer or intermediate server 200 in the same local network. The computing cloud or primary remote server 300 is a more powerful computing server, located in cloud. In smart auditors, the system has implemented the proposed modules for real-time data collection in Python. In this embodiment, the system also deployed a camera open-source software in the connected device for IoT service prototyping. This software includes motion detection as well as video streaming. In this exemplary embodiment, the smart auditor is connected to an AC adapter, and the IoT device is provided power through the smart auditor, following the circuit in FIG. 2C.

In some embodiments, the system can be configured to also implement a privacy-preserved online classifier in Python. According to Protocol 1, the system's privacy-preserved online classifier comprises 6 steps. Steps 2 and 5 are implemented in the computing cloud or primary remote server 300, whereas Steps 1, 3, 4, and 6 are implemented in the data inferencer or intermediate server 200. Moreover, each step can be done without a corresponding state. Hence, each step conducts instructions based on the received data from the previous step and returns the result to the next step. Thus, in this embodiment, the system has implemented applied pipeline processing to a contemplated 6-step classification protocol. Having said that, a processor can handle the next arrived message once each step is completed.

Figure 11A:
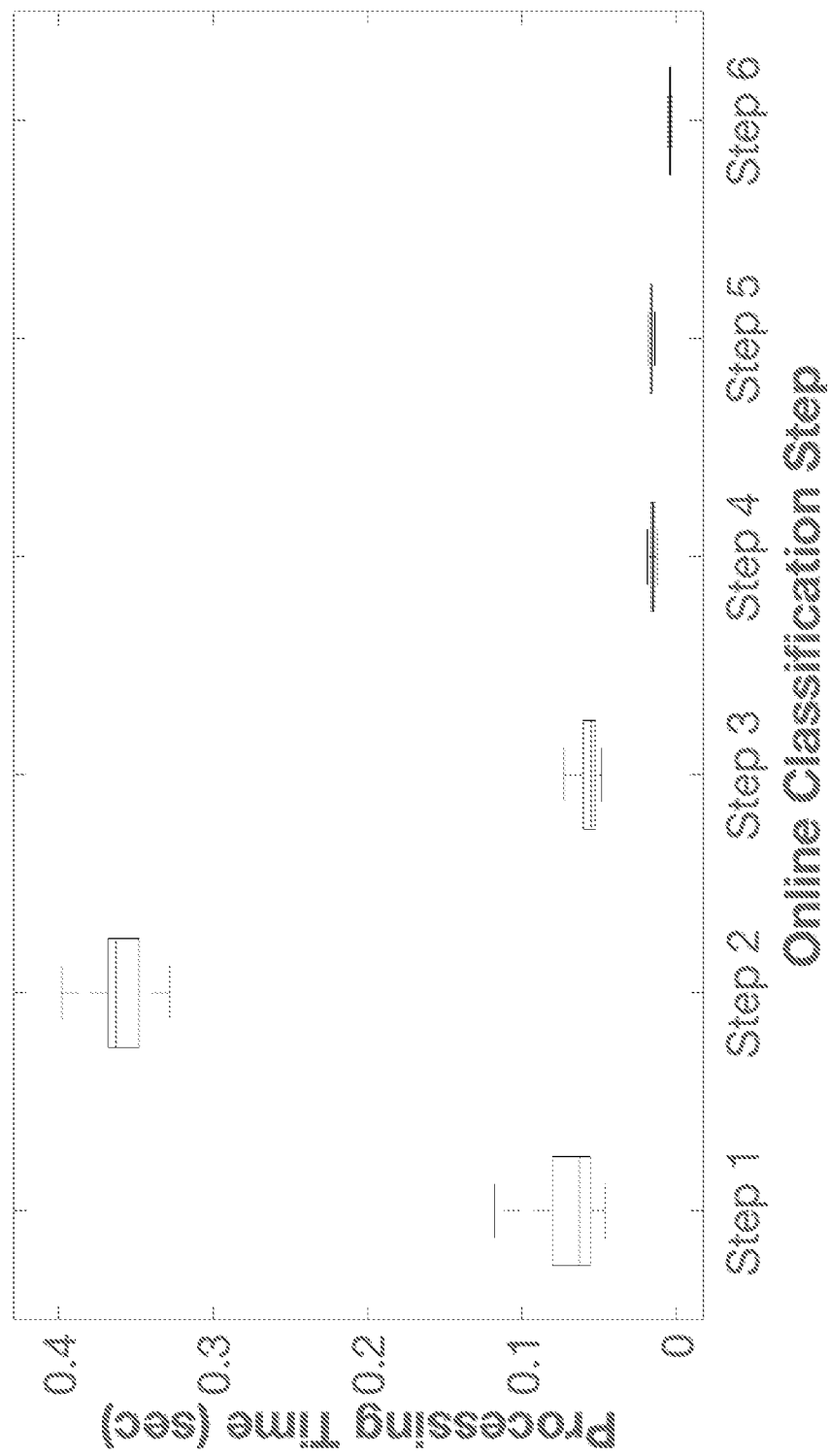
FIG. 11A shows a graphical representation of an exemplary bot detection system and its performance with regard to processing time with regard to various online classification steps.
Figure 11B:
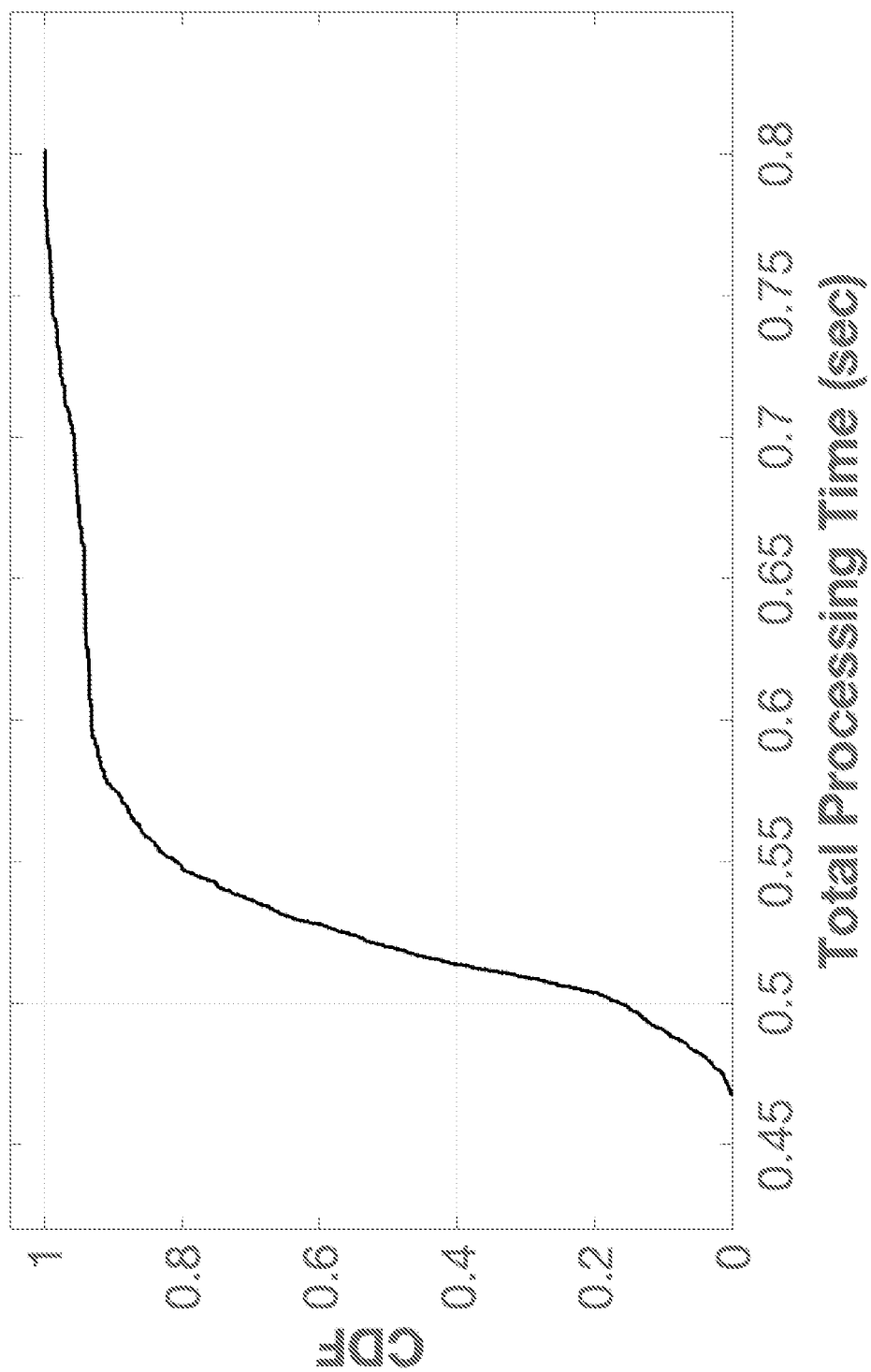
FIG. 11B shows a graphical representation of an exemplary bot detection system and its performance with regard to cumulative distribution function (CDF) and associated processing time.

Table VI, as illustrated in FIG. 10B, describes the performance metrics while an exemplary single smart auditor is running. The maximum CPU load in this exemplary smart auditor is up to 78%. Memory usage is 10 MBytes. Based on this particular exemplary embodiment's sliding window protocol design, the network traffic from a single smart auditor was realized at 123 Kbps. Processing time per instance was realized at about 25 ms for each TCP packet. In the privacy-preserved online classifier, the classification time per each instance is about 520 milliseconds. The classifier could then be deployed in separate servers; thus, Table VI, as illustrated in FIG. 10C, also shows the performance of each such exemplary module. Note that the memory size of Steps 1, 4, and 5 is 56 Bytes, whereas the memory size of Step 2 is 560 Bytes. Thus, the network rate between the data inferencer or intermediate server 200 and the computing cloud or primary remote server 300 is about 11.375 Kbps. In FIGS. 11A-B, are illustrated the processing time of online classification. FIG. 11A shows the processing delay of each step. It takes about 360 ms for the convolution procedure (Step 2) at the computing cloud or primary remote server 300, which dominates the entire online classification. FIG. 11B demonstrates an empirical CDF function of this particular embodiment of the system's privacy-preserved online classification. Over 80% of the instances took more than 500 ms. Since this embodiment of the system is designed to classify real-time instances every 500 ms for each smart auditor, the computing cloud or primary remote server 300 should process an instance within 500 ms. Thus, the system has applied pipeline processing for online classification, so the entire processing time per instance relies on Step 2, which is about 360 ms in the system's classifier. Even though the data inferencer or intermediate server 200 classifies an instance 800 ms at most after the data inferencer or intermediate server 200 receives the packet as shown in FIG. 10b, the classifier as an entire system can securely classify instances every 360 ms, which is considered to be a reliable system.

Based on the trained classifier, the system was then implemented and able to measure online classification results in the same environment with a single smart auditor. In this test, the system provided the classification accuracy and other metrics to validate the classifier performance. To do so, the system was utilized in order to generate real-time instances of each class continuously and measured the metrics. Table VII, as illustrated in FIG. 10C, shows an exemplary embodiment's online classification results for each class. The result is almost the same as the offline result in Table IV, as illustrated in FIG. 10B. For example, F1-score in the offline test is 99.45%, and the online test has 98.94% F1-score. Overall, the results validate that this exemplary system's online classifier is able to distinguish different patterns of device behavior, including malicious attacks as trained.

According to FIG. 2A, a computing cloud or primary remote server 300 can cover multiple data inferencers or intermediate servers 200 as well as smart auditors. To illustrate the scalability, an exemplary embodiment was employed in which an environment with 8 smart auditors was set up.

In another exemplary implementation the data inferencer or intermediate server 200 can be connected to multiple smart auditors 100, and multiple Data Inferencers or intermediate servers 200s can be connected to a common computing cloud or primary remote server 300.

Figure 12A:
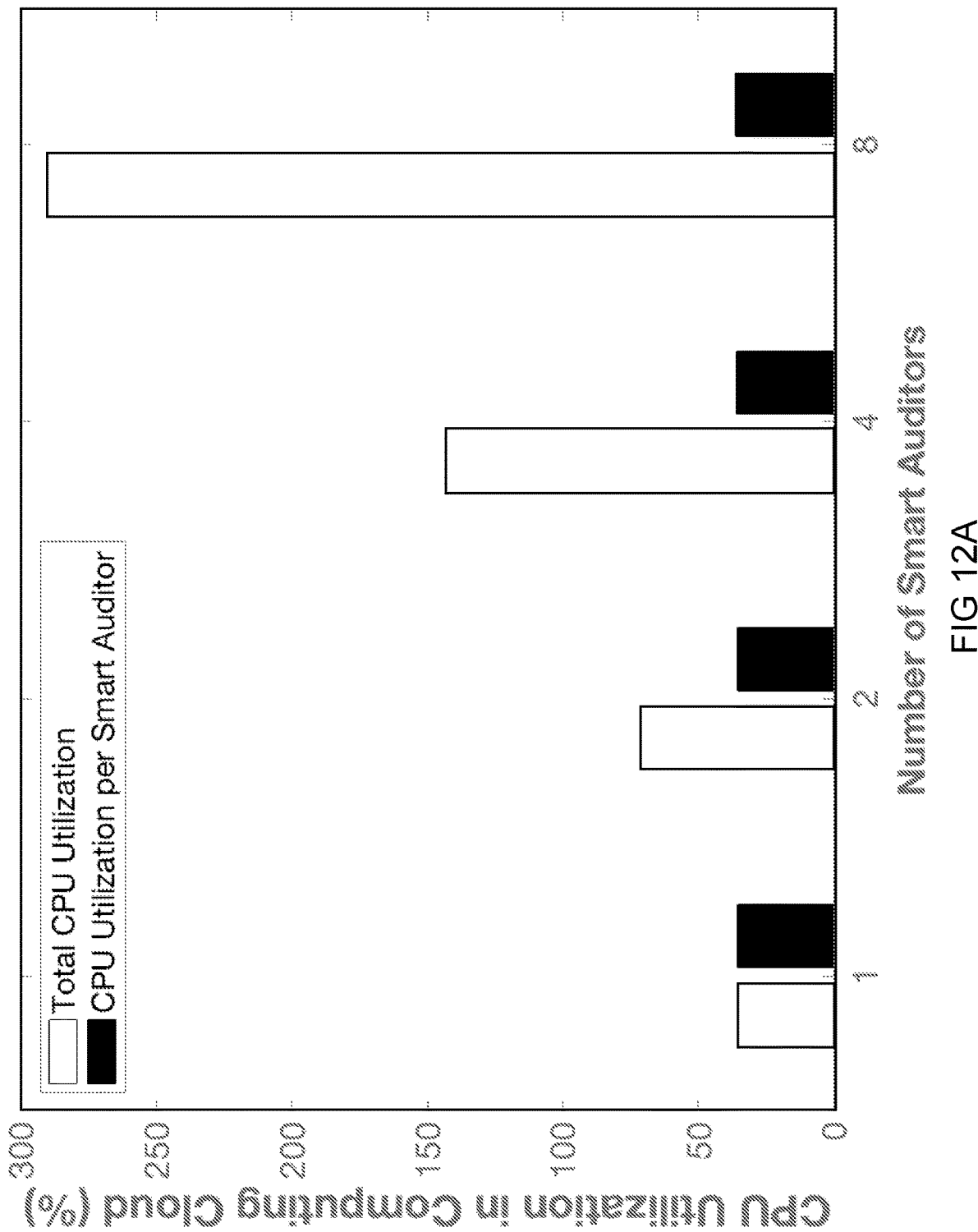
FIG. 12A shows a graphical representation of an exemplary bot detection system and its performance with regard to number of smart auditors and CPU utilization in a computing cloud or remote server on a distributed cloud computing implantation of an exemplary bot detection system in accordance with various aspects of the present invention.
Figure 12B:
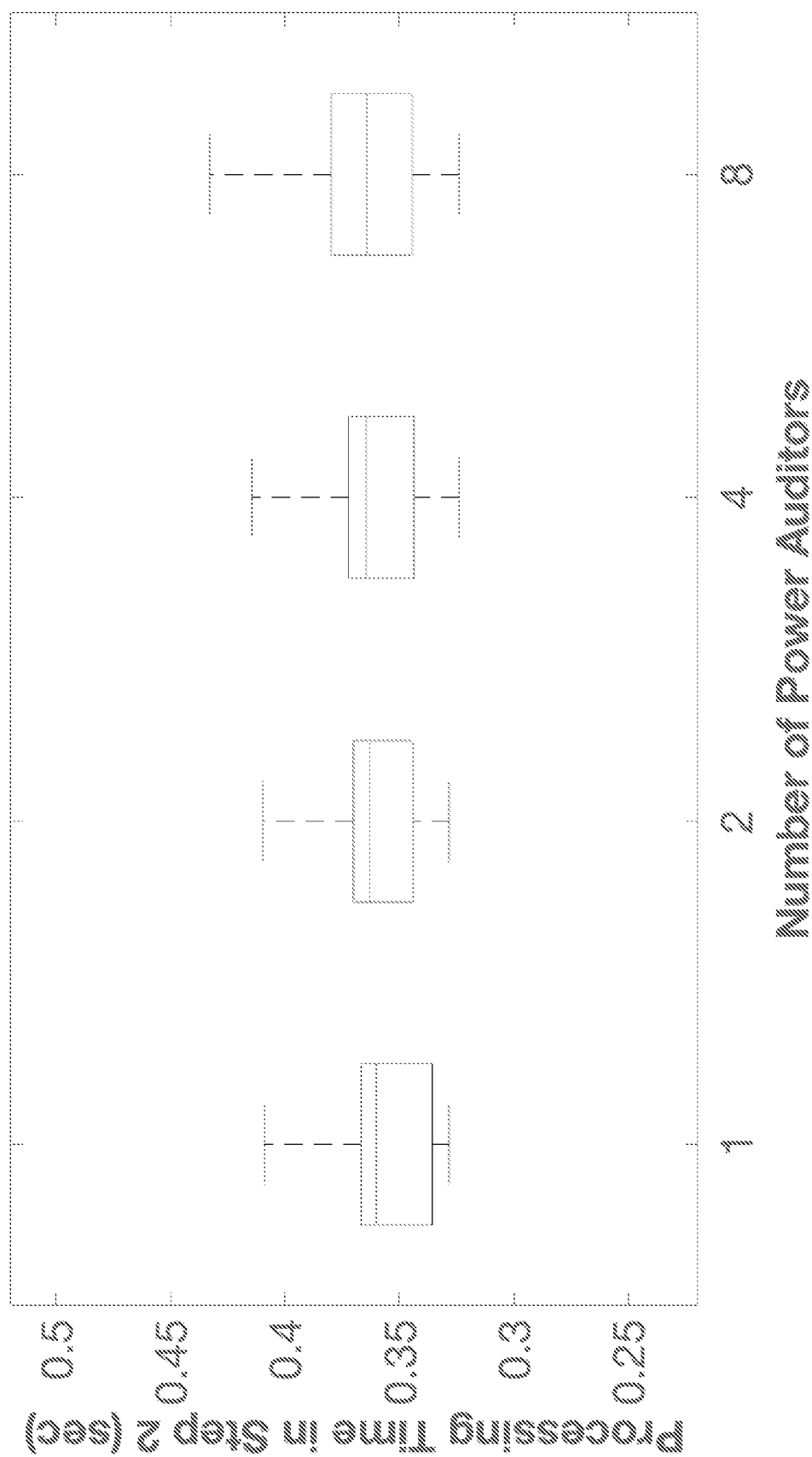
FIG. 12B shows a graphical representation of an exemplary bot detection system and its performance with regard to number of smart auditors and processing time utilizing an exemplary bot detection system in accordance with various aspects of the present invention.

FIGS. 12A-B show the performance results when the system monitors a different number of smart auditors. In FIG. 11a, as the number of smart auditors increases, the CPU utilization of Computing Cloud increases linearly. FIG. 12B also validates that the processing time does not change much. These results demonstrate that the computing cloud or primary remote server 300 supports multiple data Inferencer or intermediate servers 200, up to as much as the system CPU cores can handle. For example, Step 2 takes about 360 ms, and the CPU utilization of the computing cloud or primary remote server 300 is about 35% for a single smart auditor. Thus, a single core of the computing cloud or primary remote server 300 can handle 2 or 3 smart auditors per second. Since the server used for this particular implementation of the computing cloud or primary remote server 300 has 32 CPU cores, technically, this server may handle around 90 smart auditors based on the presented experiment results.

In some embodiments the CNN can be employed in a manner so as to utilize previously captured data correlated to various IoT device functions so as to tabulate normal operations with associated power consumption levels. Wherein outlier or unrecognized patterns in power consumption levels can then be correlated to unknown, impermissible, or other likely bot activities and wherein the smart power source can then be shut down so as to eliminate the use of the bot protocols on a specific IoT device, by shutting down the IoT device when such power consumption is detected. In such embodiments it has been recognized that the CNN is primarily trained up front and can be utilized to generate tables of normal activities with associated power consumption levels for future verifications.

Alternatively, the CNN can be replaced with a DRCNN (deep recurrent convolutional neural network) which can further be utilized on a connected network of similar IoT devices to gather real time data, receive information with confirmed threats and power consumption levels, or any other variety of parameters and verifications to continually update the power consumption databases associated with abnormal or normal functionality of a specific IoT device.

In such deep network configurations, the system can be configured to receive real data as IoT connected systems degrade or firmware updates that might perhaps result in changes to the power consumption, and therefore adjust the parameters so as to recognize attacks or improper use and eliminate potentially unnecessary power shutdowns of the associated smart power devices. In such embodiments the system can then be configured to take into account system age, usage hours, model numbers, and other configuration parameters so as to accurately determine the existence or implementation of a bot attack and react accordingly by cutting power to such a device.

It is noted that, unless specified otherwise, no specific order is required in the aforementioned methods, though generally these method steps can be carried out sequentially. Although application of the alternating voltage to the given electrodes about the suspension fluid ought to be performed at least at some time while the suspension fluid is in a liquid state. Then depending on the speed of freezing and the desired characteristics of the ice crystals resulting from freezing the fluid at different rates it will be appreciated that application of the alternating voltage can be adjusted so as to achieve a desired effect.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

We claim:

1. A system for the detection and system impact mitigation of bots in Internet of Things (IoT) devices, the system comprising:
a smart auditor configured to interface with and control a power supply of an IoT device, the smart auditor comprising:
a power data processing unit configured to measure current power usage information from the IoT device;
a networking module configured to receive and transmit the power usage information; and
a power control unit configured to control the power supply of the IoT device;
a primary remote server; and
an intermediate server provided between the smart auditor and the primary remote server configured to receive the power usage information from the smart auditor, encrypt the power usage information, and transmit the encrypted power usage information;
the primary remote server comprising:
a primary processor; and
a primary non-transitory computer-readable medium containing an IoT power usage database containing historical power usage information of various IoT devices in normal operation modes and know infected operation modes, wherein the primary non-transitory computer-readable medium contains instructions for the primary processor to perform the following tasks:
receive information regarding a model of the IoT device;
receive encrypted power usage information from the intermediate server;
compare the current power usage information to historical power usage information correlating to the particular model of the IoT device in both normal operation and in an infected state indicative of malicious bot activity on the IoT device thus generating comparison data;
encrypt the comparison data;
obtaining the comparison data; and
transmit the encrypted comparison data to the intermediate server;
the intermediate server comprising:
an intermediate processor; and
an intermediate non-transitory computer-readable medium, the intermediate non-transitory computer-readable medium containing instructions for the intermediate processor to perform the following tasks:
receive the encrypted comparison data from the primary remote server;
decrypt the comparison data;
determine indications of bot activity within the IoT device based on comparison data;
generate one or more recommended instructions for the smart auditor; and
transmit one or more recommended instructions to the smart auditor, wherein upon a determination of an infected state of the IoT device, at least one recommended instruction being for the power control unit of the smart auditor to interrupt power; and
wherein the smart auditor is configured to execute the one or more recommended instructions.

2. The system for the detection and system impact mitigation of bots IoT devices of claim 1, wherein the primary remote server includes a convolutional neural network model for classification of the current power usage information from the IoT device.

3. The system for the detection and system impact mitigation bots IoT devices of claim 1, further comprising a convolutional neural network model for classification of the current power usage information from the IoT device.

4. The system for the detection and system impact mitigation of bots IoT devices of claim 3, wherein the convolutional neural network model is deployed across the primary remote server and the intermediate server, wherein the primary remote server and the intermediate server are non-colluding.

5. The system for the detection and system impact mitigation of bots IoT devices of claim 4, wherein the intermediate server removes any private identification data regarding the IoT device from all data transmitted to the primary remote server.

6. The system for the detection and system impact mitigation of bots IoT devices of claim 4, wherein the primary remote server removes any model parameters of the CNN from all data transmitted to the intermediate server.

7. The system for the detection and system impact mitigation bots IoT devices of claim 1, wherein the primary remote server is provided as a plurality of distributed computing servers.

8. The system for the detection and system impact mitigation of bots IoT devices of claim 1, wherein the primary remote server is provided as a plurality of distributed computing servers.

9. A method for the detection and mitigation of system impact of bots in Internet of Things (IoT) devices, the method comprising:
providing a smart auditor configured to interface with, and control, a power supply of an IoT device, the smart auditor comprising:
a power data processing unit configured to measure current power usage information from the IoT device;
a networking module configured to receive and transmit the power usage information; and a power control unit configured to control the power
supply of the IoT device; and
providing a primary remote server;
providing an intermediate server provided between the
smart auditor and the primary remote server,
the primary remote server comprising:
a primary processor; and
a primary non-transitory computer-readable medium
containing an IoT power usage database containing
historical power usage information of IoT devices in
normal operation modes and infected operation
modes;
measuring, by way of the smart auditor, current power
usage information from the IoT device;
receiving information regarding a model of the IoT device
by the intermediate server;
transmitting information regarding the current power
usage information of the IoT device from the smart
auditor to the intermediate server;
encrypting information regarding a model of the IoT
device at the intermediate server;
encrypting current power usage information from the IoT
device at the intermediate server;
transmitting the encrypted current power usage information
and the encrypted information regarding a model
of the IoT device to the primary remote server;
receiving the encrypted current power usage information
from the IoT device at the primary remote server;
comparing the current power usage information to historical
power usage information correlating to the particular
model of the IoT device in both normal operation
and in an infected state indicative of malicious bot
activity on the IoT device, thus generating comparison
information;
encrypting the comparison information;
obtaining the encrypted comparison information at the
primary remote server;
transmitting the encrypted comparison information from
the primary remote server to the intermediate server;
decrypting the encrypted comparison information at the
intermediate server;
determining indications of bot activity within the IoT
device based on the comparison information at the
intermediate server;
generating one or more recommended instructions upon
determination of bot activity at the intermediate server;
transmitting the one or more recommended instructions
from the intermediate server to the smart auditor; and
causing the smart auditor to execute the one or more
recommended instructions.

10. The method for the detection and mitigation of system impact of bots in IoT devices of claim 9, wherein upon determination of bot activity, the one or more recommended instructions includes at least one instruction to interrupt power.

11. The method for the detection and mitigation of system impact of bots in IoT devices of claim 10, further comprising:
providing a convolutional neural network model for classification of the current power usage information from the IoT device.

12. The method for the detection and mitigation of system impact of bots in IoT devices of claim 11, wherein:
the convolutional neural network model is deployed across the primary remote server and the intermediate server, wherein the primary remote server and the intermediate server are non-colluding.

13. The method for the detection and mitigation of system impact of bots in IoT devices of claim 12, removing any private identification data regarding the IoT device from all data transmitted from the intermediate server to the primary remote server.

14. The method for the detection and mitigation of system impact of bots in IoT devices of claim 12, removing any model parameters of the convolutional neural network from all data transmitted from the primary remote server to the intermediate server.

15. The method for the detection and mitigation of system impact of bots in IoT devices of claim 9, further comprising:
providing a convolutional neural network model for classification of the current power usage information from the IoT device.

16. The method for the detection and mitigation of system impact of bots in IoT devices of claim 15, wherein the primary remote server is provided as a plurality of distributed computing servers.

17. The method for the detection and mitigation of system impact of bots in IoT devices of claim 9, wherein the primary remote server is provided as a plurality of distributed computing servers.

18. A system for the detection and system impact mitigation of bots in Internet of Things (IoT) devices, the system comprising:
a smart auditor configured to interface with and control a power supply of an IoT device, the smart auditor comprising:
a power data processing unit configured to measure current power usage information from the IoT device;
a networking module configured to receive and transmit the power usage information; and
a power control unit configured to control the power supply of the IoT device; and
an intermediate server configured to receive IoT device model information and current power usage information from the smart auditor, encrypt and transmit the IoT device model information and current power usage information;
a primary remote server configured to receive the encrypted power usage information from the intermediate server;
the primary remote server further comprising:
a primary processor; and
a primary non-transitory computer-readable medium containing a IoT power usage database containing historical power usage information of IoT devices in normal operation modes and infected operation modes, wherein the primary non-transitory computer-readable medium contains instructions for the primary processor to perform the following tasks:
receive the information regarding a model of the IoT device;
receive the information regarding the current power usage information of the IoT device;
compare the current power usage information to historical power usage information correlating to the particular model of the IoT device in both normal operation and in an infected state indicative of malicious bot activity on the IoT device;
obtaining all data regarding a comparison in the encrypted form between known power usage of the particular model of IoT device within the historical and the current power usage information of the IoT device transmit the encrypted data regarding a comparison between known power usage of the particular model of IoT device within the historical and the current power usage information of the IoT device to the intermediate server;

the intermediate server being provided between the smart auditor and the primary remote server, the intermediate server further comprising:

an intermediate processor; and an intermediate non-transitory computer-readable medium, the intermediate non-transitory computer-readable medium containing instructions for the intermediate processor to perform the following tasks:

encrypt all data transmitted to the primary remote server regarding the IoT device;

receive and decrypt the encrypted data regarding a comparison between known power usage of the particular model of IoT device within the historical and the current power usage information of the IoT device to the intermediate server; and determine indications of bot activity based on the comparison received from the remote primary server;

generate one or more recommended instructions for execution by the smart auditor; and transmit the one or more recommended instructions to the power control unit of the smart auditor;

wherein the power control unit of the smart auditor is then configured to execute the one or more recommended instructions from the intermediate server; and a convolutional neural network model for classification of the current power usage information from the IoT device being deployed across the primary remote server and the intermediate server, wherein the primary remote server and the intermediate server are non-colluding.

19. The system for the detection and system impact mitigation bots IoT devices of claim 18, wherein upon determination of bot activity, the one or more recommended instructions includes at least one instruction to interrupt power.

20. The system for the detection and system impact mitigation bots IoT devices of claim 18, wherein the primary remote server is provided as a plurality of distributed computing servers.

* * * * *